US006678207B2

(12) United States Patent
Duren

(10) Patent No.: US 6,678,207 B2
(45) Date of Patent: Jan. 13, 2004

(54) TRAPPED WATER BOTTOM MULTIPLE AND PEG-LEG MULTIPLE SUPPRESSION FOR OCEAN BOTTOM SEISMIC DATA

(75) Inventor: Richard E. Duren, Conroe, TX (US)

(73) Assignee: ExxonMobil Upstream Research Company, Houston, TX (US)

(*) Notice: Subject to any disclaimer, the term of this patent is extended or adjusted under 35 U.S.C. 154(b) by 64 days.

(21) Appl. No.: 10/152,935

(22) Filed: May 22, 2002

(65) Prior Publication Data

US 2003/0048696 A1 Mar. 13, 2003

Related U.S. Application Data

(60) Provisional application No. 60/293,716, filed on May 25, 2001.

(51) Int. Cl.[7] .............................. G01V 1/40; G01V 1/28
(52) U.S. Cl. ............................ 367/24; 367/22; 367/26; 181/112; 702/13; 702/14; 702/17
(58) Field of Search ............................. 367/22, 24, 26; 181/112; 702/13, 14, 17

(56) References Cited

U.S. PATENT DOCUMENTS

| | | | | |
|---|---|---|---|---|
| 3,343,626 A | * | 9/1967 | Sparks | 367/24 |
| 3,371,310 A | * | 2/1968 | Silverman | 367/24 |
| 3,943,484 A | | 3/1976 | Balderson | 340/7 |
| 3,952,281 A | | 4/1976 | Parrack | 340/7 |
| 4,146,871 A | | 3/1979 | Ruehle | 340/7 |
| 4,234,938 A | | 11/1980 | Allen et al. | 367/24 |
| 4,323,876 A | | 4/1982 | Parrack et al. | 367/40 |
| 4,344,158 A | | 8/1982 | Landrum, Jr. et al. | 367/73 |
| 4,353,121 A | | 10/1982 | Ray et al. | 367/21 |
| 4,486,865 A | | 12/1984 | Ruehle | 367/24 |
| 4,520,467 A | | 5/1985 | Berni | 367/24 |
| 4,644,507 A | | 2/1987 | Ziolkowski | 367/23 |
| 4,688,198 A | | 8/1987 | Wiggins | 367/46 |
| 4,752,916 A | | 6/1988 | Loewenthal | 367/24 |
| 4,799,201 A | | 1/1989 | Nelson | 367/41 |

(List continued on next page.)

FOREIGN PATENT DOCUMENTS

WO    WO 02/097472 A2 * 12/2002

OTHER PUBLICATIONS

Barr, Fred J. and Sanders, Joe I., "Attenuation of Water–Column Reverberations Using Pressure and Velocity Detectors in a Water–Bottom Cable," *Expanded Abstracts of the 59th Annual SEG Meeting*, 1989, vol. 1, pp. 653–656.
Bale, Richard, "Plane Wave Deghosting of Hydrophone and Geophone OBC Data," *Expanded Abstracts of the 68th Annual SEG Meeting*, 1998, vol. 1, pp. 730–733.
Dragoset, Bill and Barr, Fred J., "Ocean–Bottom Cable Dual–Sensor Scaling," *Expanded Abstracts of the 64th Annual SEG Meeting*, 1994, pp. 857–860.
Loewenthal, D., Lee, S. S. and Gardner, G. H. F., "Deterministic Estimation of a Wavelet Using Impedance Type Technique," 1985, *Geophysical Prospecting*, vol. 33, pp. 956–969.

*Primary Examiner*—Nelson Moskowitz
(74) *Attorney, Agent, or Firm*—Keith A. Bell

(57) ABSTRACT

The invention is a method for removing trapped water bottom multiples, receiver side peg-leg multiples, and source side peg-leg multiples from dual sensor OBC data, where the data includes both pressure signals and velocity signals. The pressure and velocity signals are compared to determine any polarity reversals between them. Polarity reversals are used to identify and separate up-going and down-going wavefields in the pressure and velocity signals. A matching filter is applied to a portion of the velocity signal where polarity reversals exist. The down-going wavefield is then estimated by calculating the difference between the portion of the velocity signal where polarity reversals exist and the portion of the pressure signal where polarity reversals exist and applying a scaling factor to the result. An attenuated up-going pressure wavefield is then determined by combining the estimated down-going wavefield and the pressure signal.

34 Claims, 13 Drawing Sheets

U.S. PATENT DOCUMENTS

| | | | |
|---|---|---|---|
| 4,837,723 A | 6/1989 | Peacock | 364/724 |
| 4,910,716 A | 3/1990 | Kirlin et al. | 367/24 |
| 4,935,903 A | 6/1990 | Sanders et al. | 367/24 |
| 4,937,794 A | 6/1990 | Marschall et al. | 367/21 |
| 4,979,150 A | 12/1990 | Barr | 367/24 |
| 4,992,992 A | 2/1991 | Dragoset, Jr. | 367/21 |
| 4,992,995 A | 2/1991 | Favret | 367/43 |
| 5,051,960 A | 9/1991 | Levin | 367/24 |
| 5,051,961 A | 9/1991 | Corrigan et al. | 367/24 |
| 5,182,729 A | 1/1993 | Duren et al. | 367/38 |
| 5,253,217 A | 10/1993 | Justice, Jr. et al. | 367/46 |
| 5,309,360 A | 5/1994 | Monk et al. | 364/420 |
| 5,365,492 A | 11/1994 | Dragoset et al. | 367/21 |
| 5,384,752 A | 1/1995 | Duren et al. | 367/38 |
| 5,396,472 A | 3/1995 | Paffenholz | 367/24 |
| 5,400,299 A | 3/1995 | Trantham | 367/38 |
| 5,442,591 A | 8/1995 | Dragoset, Jr. et al. | 367/21 |
| 5,448,531 A | 9/1995 | Dragoset, Jr. | 367/45 |
| 5,621,700 A | 4/1997 | Moldoveanu | 367/24 |
| 5,696,734 A | 12/1997 | Corrigan | 367/24 |
| 5,729,506 A | 3/1998 | Dragoset, Jr. et al. | 367/24 |
| 5,754,492 A | 5/1998 | Starr | 367/24 |
| 5,757,723 A | 5/1998 | Weglein et al. | 367/38 |
| 5,774,416 A | 6/1998 | Sadek et al. | 367/24 |
| 5,774,417 A | 6/1998 | Corrigan et al. | 367/24 |
| 5,793,702 A | 8/1998 | Paffenholz | 367/24 |
| 5,835,451 A | 11/1998 | Soubaras | 367/24 |
| 5,963,507 A | 10/1999 | Barr et al. | 367/15 |
| 5,991,238 A | 11/1999 | Barr | 367/62 |
| 5,995,905 A | 11/1999 | Ikelle et al. | 702/16 |
| 6,021,090 A | 2/2000 | Gaiser et al. | 367/15 |
| 6,101,448 A | 8/2000 | Ikelle et al. | 702/17 |
| 6,151,275 A * | 11/2000 | Starr | 367/57 |
| 6,263,285 B1 * | 7/2001 | Starr | 702/17 |

* cited by examiner

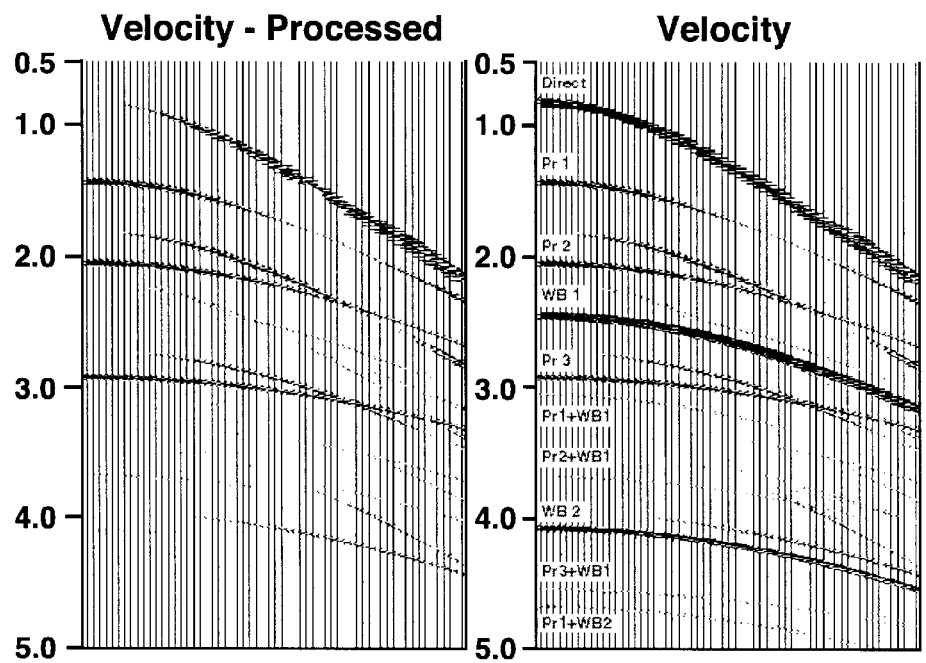
FIG. 13
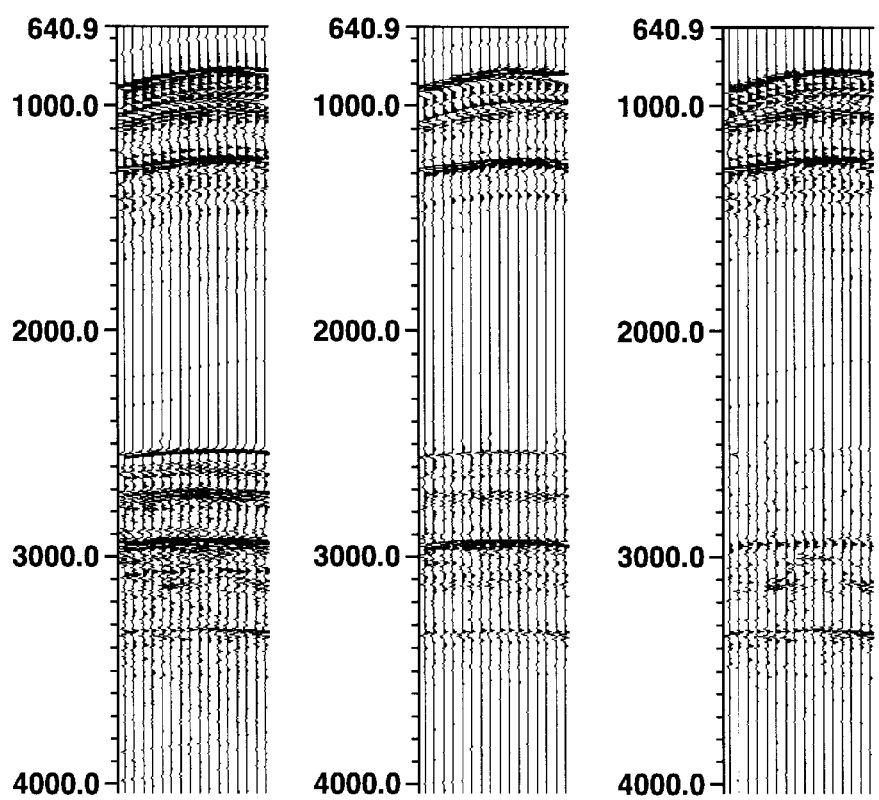
FIG. 14A  FIG. 14B  FIG. 14C

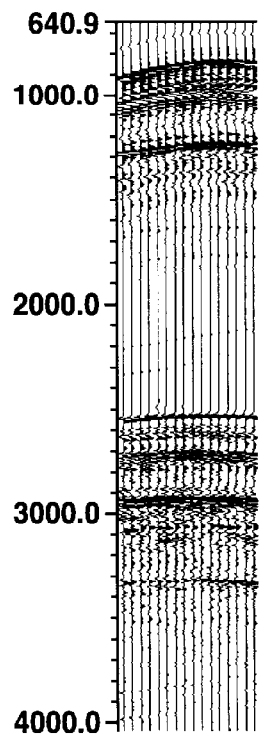 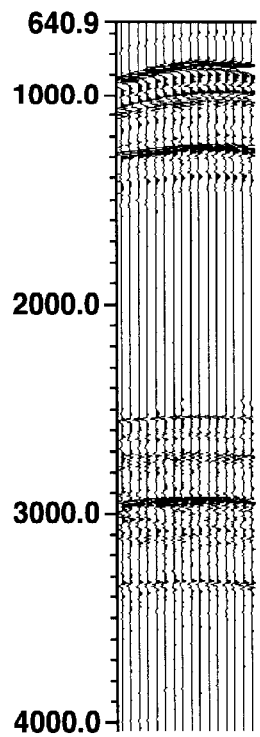 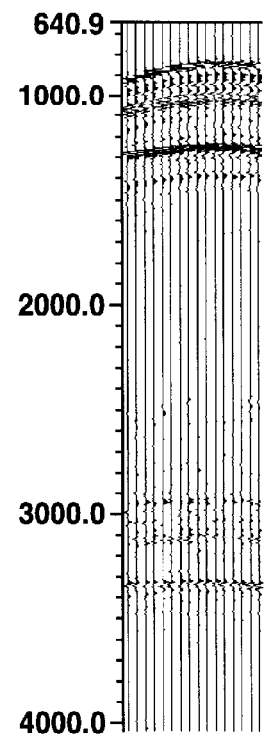
FIG. 15A   FIG. 15B   FIG. 15C
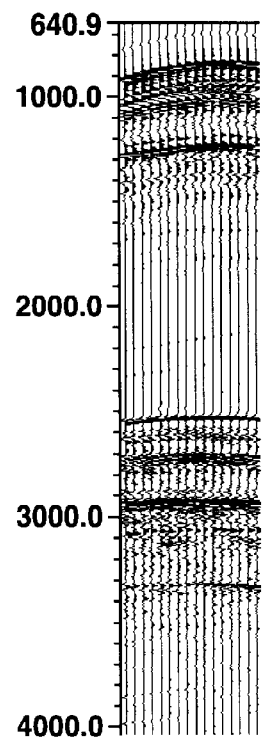 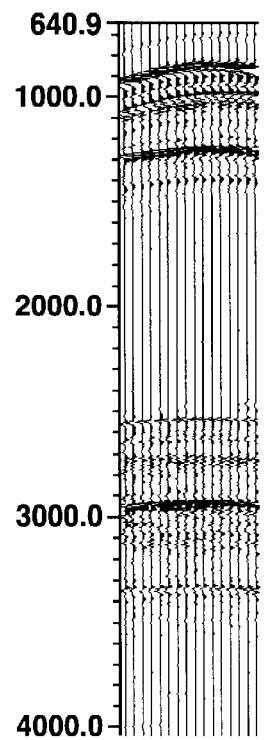 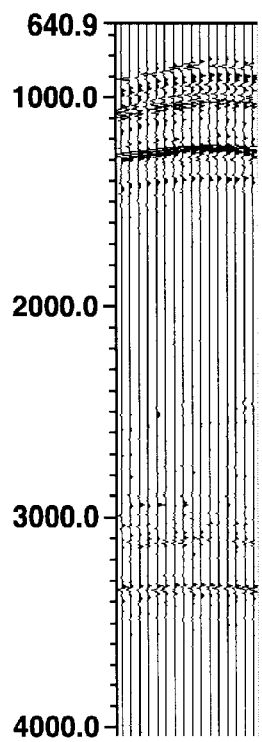
FIG. 16A   FIG. 16B   FIG. 16C

TRAPPED WATER BOTTOM MULTIPLE AND PEG-LEG MULTIPLE SUPPRESSION FOR OCEAN BOTTOM SEISMIC DATA

This application claims the benefit of U.S. Provisional Application No. 60/293,716 filed on May 25, 2001.

BACKGROUND OF THE INVENTION

Marine seismic exploration usually involves acquiring seismic data using a seismic acquisition system whose source initiates a down-going seismic wavefield. A portion of the down-going wavefield travels into the underlying earth where it illuminates subsea geologic formations. As it illuminates the interfaces or boundaries between the formations, part of the wavefield is returned (or reflected) back through the earth (propagating in the up-going direction). Part of the reflected wavefield is received by the seismic acquisition system, converted into electrical signals, and recorded for subsequent processing. An analysis of these recorded signals makes it possible to estimate the structure, position, and lithology of subsea geologic formations, thereby completing an important step in the exploration process.

FIG. 1 shows a simplified example of a typical marine seismic acquisition system. A first ship 1 tows a seismic source 2 several feet below the surface 3 of the ocean. The seismic source 2 is activated to produce a down-going wavefield $4d$ that is at least partially reflected by a subsea formation boundary 5 or subsea impedance discontinuity. The up-going wavefield $4u$ then travels toward the sensors 6 and is detected.

The sensors 6 used in marine seismic exploration include pressure sensors and velocity (also referred to as "particle velocity") sensors. Typically, the pressure sensors are hydrophones and the velocity sensors are geophones. The hydrophones measure a scalar pressure and are not sensitive to the propagation direction of the wavefield. The geophones, which may be vertical geophones, provide a vector response measurement whose polarity depends on whether the direction of propagation of the wavefield is up-going or down-going. The amplitude of the geophone response is also related to an angle of the propagation relative to the sensitive direction of the geophone. If a wavefield is recorded by a hydrophone and a geophone with similar electronic impulse responses, then a polarity comparison between the hydrophone and geophone measurement determines whether the wavefield is propagating in the up-going or down-going direction. Hydrophones and geophones disposed at the seafloor are typically used in pairs when collecting seismic data. A combination of this two component or "dual sensor" data (pressure and particle velocity) has been useful to cancel down-going multiples from a combined pressure and vertical velocity data signal. The importance of this aspect of the sensor pairing will be discussed in detail below.

In one type of marine seismic surveying, the sensors 6 are located at regular intervals in ocean bottom cables (OBC) 7 that are arranged on the seafloor 9. When necessary, a second ship 8 is used to move the OBC 7 to a new position on the seafloor 9. Several miles of OBC 7 are typically deployed along the seafloor 9, and several OBCs are typically deployed in parallel arrangements. OBC 7 arrangements are particularly well suited for use in certain zones (such as zones cluttered with platforms or where the water is very shallow) where the use of ship-towed hydrophone arrays (not shown) (which are located proximate the ocean surface 3 and are typically referred to as "streamers") is not practical.

The collection of data with OBC during seismic data acquisition is complicated by secondary wavefields, also known as "multiples." Multiples comprise trapped water bottom multiples, source side peg-leg multiples, and receiver side peg-leg multiples. Multiples can mask the seismic data of interest, and they amplify and attenuate certain frequencies, thereby complicating the analysis of the recorded signals. The "multiple problem" is caused by, among other factors, the air-water interface at the surface of the ocean or water column. The following discussion provides a more detailed description while implicitly assuming one dimensional geometry.

When the seismic source is fired, the direct arriving down-going wavefield impacts the seafloor. A portion of the down-going wavefield travels into the subsurface and provides the primary seismic data by reflecting off of subsurface formations. Another portion of the same down-going wavefield is reflected back into the water column. This up-going wavefield travels back to the ocean surface and is reflected back in a down-going direction. A down-going wavefield reflected off of the ocean surface may be referred to as a "ghost." A ghost subsequently impacts the seafloor where, as for the direct arriving down-going wavefield, a portion travels into the subsurface and a portion is reflected back into the water column to generate subsequent ghosts. Hence, some portion of a ghost is reflected back into the water column and remains trapped in the water column, forming the trapped water bottom multiple (or subsequent multiple ghost arrivals), while the remainder propagates into the subsurface, leading to the formation of delayed and scaled copies of the primary seismic data (referred to as source side peg-leg multiples) as the delayed down-going wavefield reflects off of the subsurface formations.

Up-going wavefields from the subsurface result from the portion of the direct arrival that initially travels into the subsurface (the primary reflection) and the subsequent source side peg-leg multiples that pass through the seafloor. The up-going wavefields will be recorded at the seafloor. However, after being recorded, the up-going wavefields continue upward and subsequently impact the air-water interface and are reflected in a down-going direction. As a result, the primary and source side peg-leg multiples form down-going ghosts. The water trapped portions of these wavefields are called the receiver side peg-leg multiples, and the portion of these wavefields that travel into the subsurface are ignored for the purposes of this discussion because they contain higher order subsurface reflections than are relevant for the analysis presented herein.

FIG. 2 shows two-dimensional examples of wavefields that are produced by a source 10 and are detected by a sensor pair 11. The source 10 is typically located proximate the ocean surface 12. A direct arrival 18 is a wavefield that travels directly from the source 10 to the sensor pair 11. A receiver-side peg-leg 13, which may also be referred to as a "receiver side multiple," is produced when the wavefield is first reflected by a subsurface formation 16 and then by the ocean surface 12 before being detected by the sensor pair 11. A source side peg-leg 15, which may also be referred to as a "source side multiple," is produced when the wavefield reflects off of the seafloor 14, off of the ocean surface 12, and then off of a subsurface formation 16 before being detected by the sensor pair 11. These wavefields differ from a primary wavefield 17 that reflects off of the target formation 16 and is then detected by the sensor pair 11 before experiencing any additional reflections. The water trapped multiple 19 is first reflected off the seafloor and then off the ocean surface before being detected by the sensor pair 11. For all of these multiples, there may be many reverberations in the water column, but no more than one two-way travel path in the subsurface (for the water trapped multiple 19, there is no travel path in the subsurface). Detection and proper processing of the primary wavefield 17 is an important objective in seismic exploration. The primary wavefield 17 may be corrupted by the multiples that may also be detected by the sensor pair 11.

The elimination of multiples can be an important part of obtaining good OBC data because, unlike a towed streamer where surface multiples produce notches in the frequency spectrum that lie beyond the usable bandwidth of the seismic energy, multiples in the OBC data produce notches within the usable bandwidth. The effectiveness of the removal of the multiples is dependent upon how well the pressure and velocity data are matched, so that up-going radiation is identically recorded by the hydrophone and geophone, and on how well the water bottom reflection coefficient (a coefficient representing how well wavefields are reflected by the seafloor) is estimated.

Prior attempts have been made to remove notches in the frequency spectrum. Barr and Sanders, in "Attenuation of water-column reverberations using pressure and velocity detectors in a water bottom cable," Expanded Abstracts of the 59th Annual SEG Meeting (1989, vol. 1), disclose a theory that assumes that the pressure and velocity transduction coefficients are known and are used to match the amplitude and phase response of the hydrophone and geophone. Calibration shooting is used to provide geophone scalars for combining the hydrophone and geophone data. The scalars are equal to:

$$\frac{1+R}{1-R}$$

where R is the ocean bottom reflection coefficient at each respective receiver station.

U.S. Pat. No. 4,979,150 issued to Barr discloses a system for reducing reverberation noise by applying a scale factor to the pressure and/or particle velocity. An enhanced signal is generated by multiplying at least one of either the pressure or the velocity by the scale factor and then summing the scaled velocity and scaled pressure.

U.S. Pat. No. 5,365,492 issued to Dragoset, Jr., discloses a method wherein geophone noise is adaptively estimated from velocity and pressure. The polarity of the noise is then reversed, and the noise is added to the velocity to form a clean, refined velocity signal. A scale factor is then applied to the refined velocity signal and the pressure is summed with the scaled refined velocity signal. The summed signal is auto-correlated, and a "varimax" function is computed. The procedure is repeated by incrementing the scale factor until the varimax function most closely approaches unity. This algorithm was developed to determine optimum geophone scalars and reflection data.

U.S. Pat. No. 5,621,700 issued to Moldoveanu discloses a method that involves adding the product of the pressure times the absolute value of velocity with the product of the velocity times the absolute value of the pressure. The method relies on a polarity flip in the velocity between up-going and down-going wavefields.

U.S. Pat. No. 5,835,451 issued to Soubaras discloses a method that combines hydrophone and calibrated geophone signals to eliminate a water trapped multiple. A calibration function is determined by selecting a time window beyond the duration of the direct arrival (e.g., where a source pulse is zero) and minimizing a "cross-ghosted" difference between the hydrophone and calibrated geophone recording. Multiples are then attenuated from the combined signal using predictive deconvolution methods that involve making an estimate for a water bottom reflection coefficient.

SUMMARY OF THE INVENTION

One aspect of the invention is a method for removing trapped water bottom multiples, receiver side peg-leg multiples, and source side peg-leg multiples from dual sensor OBC data that includes a pressure signal and a velocity signal. The pressure and velocity signals are compared to determine if polarity reversals exist between them. Polarity reversals are used to identify and separate up-going wavefields from down-going wavefields in the pressure and velocity signals. A matching filter is applied to a portion of the velocity signal where polarity reversals exist. The down-going wavefield is estimated by determining a difference between a portion of the pressure signal where polarity reversals exist and the portion of the velocity signal where polarity reversals exist and applying a scaling factor to the result. An attenuated up-going pressure wavefield is then determined by combining the estimated down-going wavefield and the pressure signal.

In another aspect, the invention is a method for removing trapped water bottom multiples, receiver side peg-leg multiples, and source side peg-leg multiples from dual sensor OBC data that includes a pressure signal and a velocity signal. The pressure and velocity signals are compared to determine if polarity reversals exist between them. Polarity reversals are used to identify and separate up-going wavefields from down-going wavefields in the pressure and velocity signals. A matching filter is applied to a portion of the pressure signal where polarity reversals exist. The down-going wavefield is then estimated by determining a difference between the portion of the pressure signal where polarity reversals exist and a portion of the velocity signal where polarity reversals exist and applying a scaling factor to the result. An attenuated up-going velocity wavefield is then determined by combining the estimated down-going wavefield and the velocity signal.

Other aspects and advantages of the invention will be apparent from the following description and the appended claims.

BRIEF DESCRIPTION OF THE DRAWINGS

FIG. 13 shows a comparison between velocity signals and processed velocity signals that have been processed with an embodiment of the invention.

FIG. 14A shows a pressure signal in an example of an ocean bottom cable shot record.

FIG. 14B shows a velocity signal in an example of an ocean bottom cable shot record.

FIG. 14C shows a processing example where each velocity signal is matched to a corresponding pressure signal in an example of an ocean bottom cable shot record, wherein the processing is performed with an embodiment of the invention.

FIG. 15A shows pressure signals in an example of an ocean bottom cable shot record.

FIG. 15B shows velocity signals in an example of an ocean bottom cable shot record.

FIG. 15C shows a processing example where each pressure signal is matched to a corresponding velocity signal in an example of an ocean bottom cable shot record, wherein the processing is performed with an embodiment of the invention.

FIG. 16A shows pressure signals in an example of an ocean bottom cable shot record.

FIG. 16B shows velocity signals in an example of an ocean bottom cable shot record.

FIG. 16C shows a processing example where polarity reversals were set to zero values in a velocity signal with a processing embodiment of the invention.

DETAILED DESCRIPTION

Figure 1:
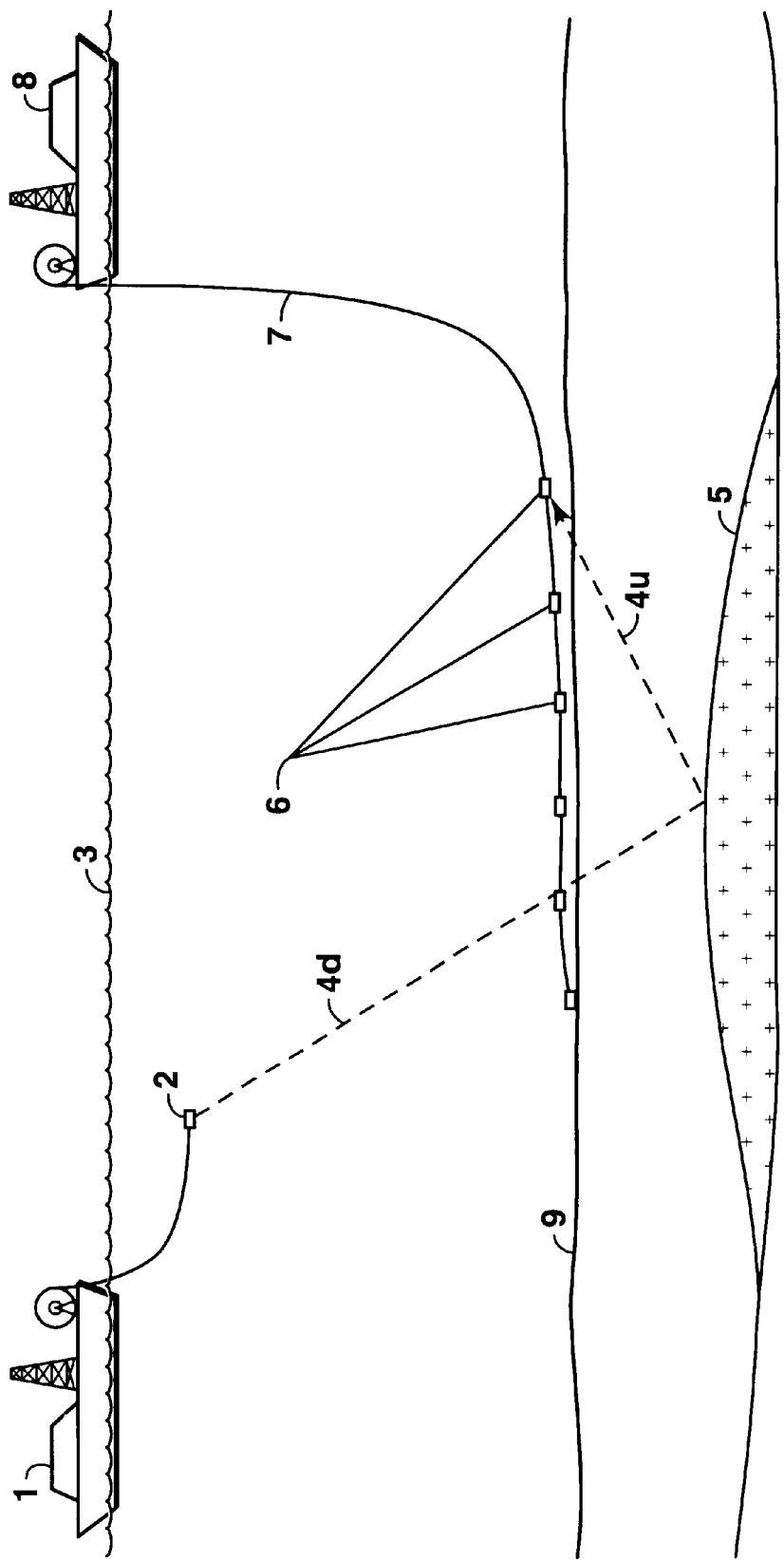
FIG. 1 shows a prior art marine seismic acquisition system.
Figure 2:
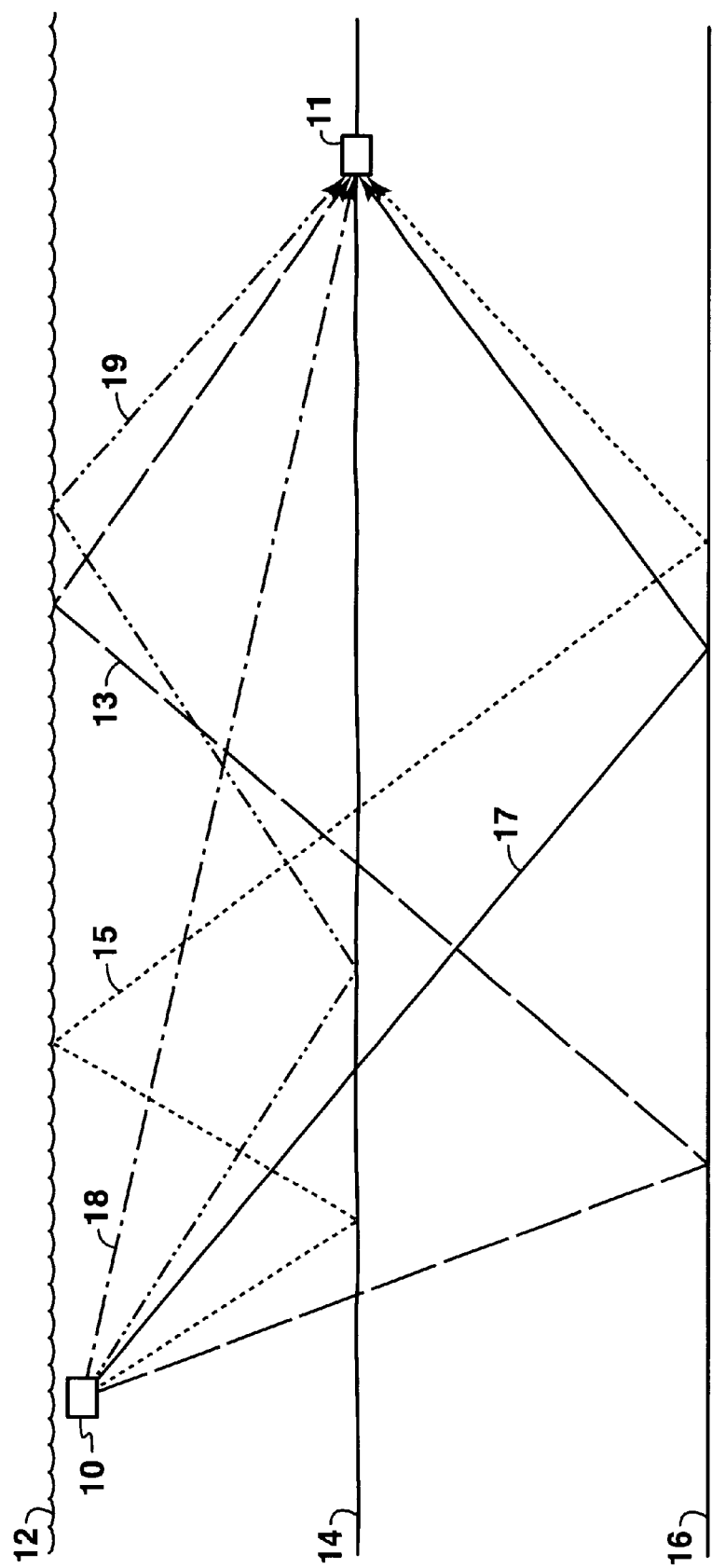
FIG. 2 shows a simplified diagram of wavefields of interest in an embodiment of the invention.
Figure 3:
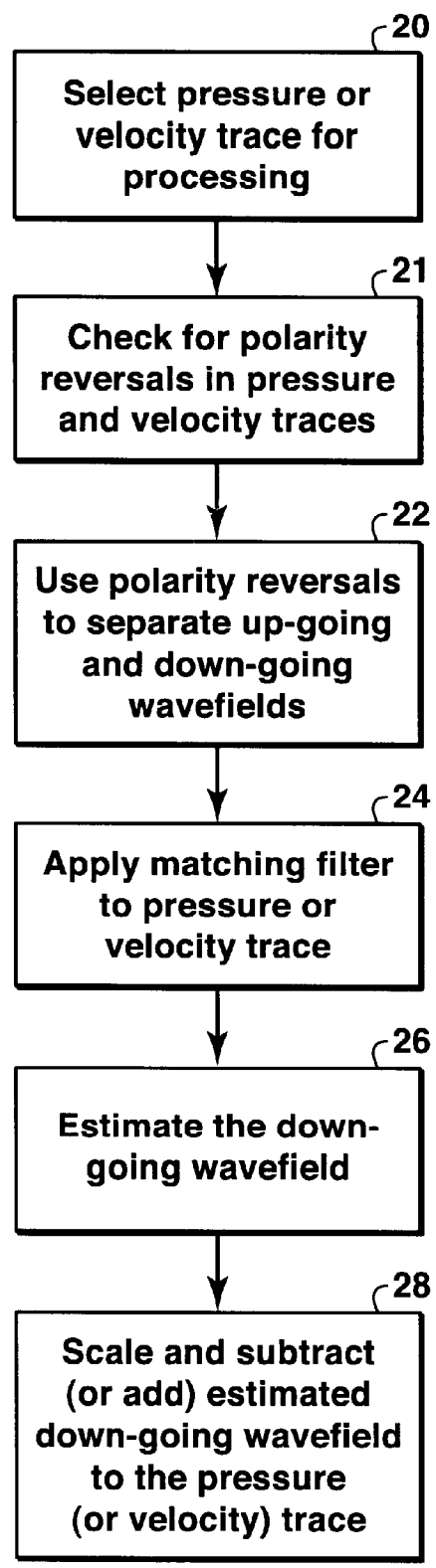
FIG. 3 shows a flowchart of an embodiment of the invention.

The embodiments of the invention relate to methods for attenuating multiples by (i) matching recorded pressure and velocity signals and (ii) processing the matched signals so as to remove water trapped multiples, receiver side peg-leg multiples, and source side peg-leg multiples from the pressure signal or the velocity signal. In one embodiment, either the pressure trace or the velocity trace is selected for processing (see block 20 in FIG. 3). Polarity differences between recorded pressure and velocity measurements (see block 21 in FIG. 3) are used to identify and separate primary and source side peg-leg multiples from down-going wavefields (see block 22 in FIG. 3). After matching the recorded signals (see block 24 in FIG. 3), processing embodiments of the invention, based on a mathematical reformulation of the ocean bottom dual sensor problem, are applied to the matched pressure and velocity data. The down-going wavefield is estimated (see block 26 in FIG. 3) by subtracting the velocity from the pressure and dividing by two. The down-going wavefield is multiplied by a factor that includes an estimate R* (which may be an estimate for the water bottom reflection coefficient, R) and subtracted (or added) to the pressure (or velocity). In this way the down-going wavefield can be used to eliminate the trapped water bottom multiples, receiver side peg-leg multiples, and source side peg-leg multiples (see block 28 in FIG. 3). Other embodiments are described below.

In seismic exploration, the terms "signal," "data trace," "trace," "shot record," "recorded data," and "measured data" refer to data recorded by a sensor pair after the seismic source has been used to produce a wavefield. A "single shot record" refers to data recorded after a single source excitation (such as a single firing of an airgun array). The shot record typically comprises data recorded at each of a plurality of subsea locations with OBC sensors. For example, after the source is fired the wavefield is sampled at a selected sampling rate for a predetermined time interval. The recorded data forms a data signal for each sensor location. A summation of a plurality of signals having common subsurface reflection points may be used to generate a "stack" of data. A stack may then be interpreted to identify and classify "events." Events may comprise, for example, direct arrivals that travel directly from the source to the sensors, primaries that have reflected off of subsea formations (such as a subsea salt structure, or a subsea hydrocarbon-bearing formation), or reflections off of an ocean-air boundary (e.g., ghosts giving rise to multiples).

Matching the Sampled Data Signals

Embodiments of the invention related to matching techniques will be discussed first. Preferably, the pressure and velocity are recorded through receiving systems with substantially identical electronic impulse responses. Pressure and velocity signals must be adjusted so that a polarity check between them at a given time will provide a meaningful indication as to whether the recorded values correspond to an up-going or a down-going wavefield.

One of the embodiments of the invention is a method that accounts for a "mismatch" in pressure and velocity signals by deconvolving the electronic impulse responses from the pressure and velocity signals. Another embodiment of the invention is a method whose goal is to deconvolve one of the signals (e.g., the pressure signal) with its impulse response and then to convolve the resulting output with the impulse response of the other signal (e.g., the velocity signal).

Finally, there may be a relatively small time shift (generally a shift of less than one sampling interval) remaining between the pressure and velocity signals. It may be desirable to resample the signals and cross-correlate them so that any residual time shift may be discovered with the cross-correlation and thereby compensated.

Processing the Matched Signals

After the pressure and velocity signals have been matched, the data may be processed to remove trapped water bottom and peg-leg multiples. In one embodiment of the invention, a polarity comparison is initially made between the pressure and velocity signals. Differences in the polarities between the pressure and velocity signals may be used to identify down-going wavefields. The comparison also permits the separation of up-going and down-going wavefields in both of the recorded data signals.

Figure 4:
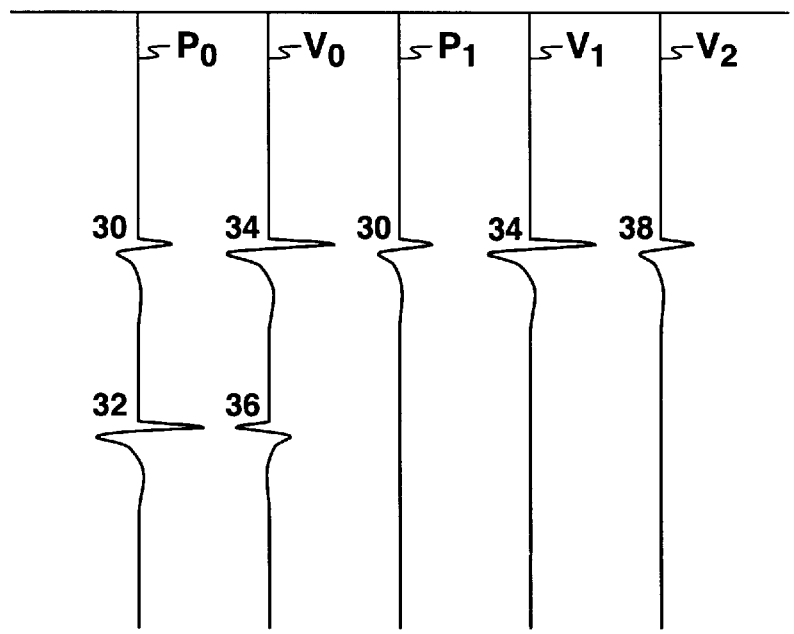
FIG. 4 shows matching filter design using the up-going wavefields in an embodiment of the invention.

In one embodiment of the invention, a matching filter is formed by using the portion of the signals that have the same polarity. When the resulting matching filter is applied, the resulting portions of the pressure and velocity signals having the same polarity are substantially identical while the polarity reversed portions of the signals can be used to find the down-going wavefield by subtracting and dividing by two. In practice, it is typically only necessary to apply the matching filter to the portion of the signal where the polarities are reversed. An example of the application of a matching filter is shown in FIG. 4. FIG. 4 shows recorded pressure ("$P_0$") and velocity ("$V_0$") signals in a system with a water bottom reflection coefficient ("R") of 0.333. Pulses 30 and 34 are primary pulses and have the same polarity. Pulses 32 and 36 have opposite polarities and contain superimposed receiver and source side peg-leg multiples. No trapped water bottom multiple is shown in this example, but the matching filter application procedure would be identical if a trapped water bottom multiple were present.

After a polarity comparison, $P_1$ and $V_1$ are identified as the portions of the signals having identical polarities and pulses 32 and 36, which have opposite polarities, are removed from the signals. The matching filter in the embodiment is designed using $P_1$ and $V_1$, and if applied to $V_1$ produces pulse 38 in the $V_2$ signal. In this embodiment, the matching filter is simply a scale factor of 0.50. Note that if $P_1$ were to be scaled into $V_1$ the matching filter would be a scale factor of 2. At this point, the result of the matching filter application is that signals $P_1$ and $V_2$ (and pulses 30 and 38) are substantially identical. The matching filter can also be derived from using the portions of the signals where the polarities are reversed (e.g., pulses 32 and 36). However, the resulting filter's impulse response function must be scaled to the same level as the impulse response function derived using pulses 30 and 34. The scaling factor is $(1-R)/(1+R)$ when the velocity is matched to pressure or $(1+R)/(1-R)$ when the pressure is matched to velocity. Hence, an estimate for the water bottom reflection coefficient, R, can be derived from a ratio of the peaks of the impulse response functions.

Figure 5:
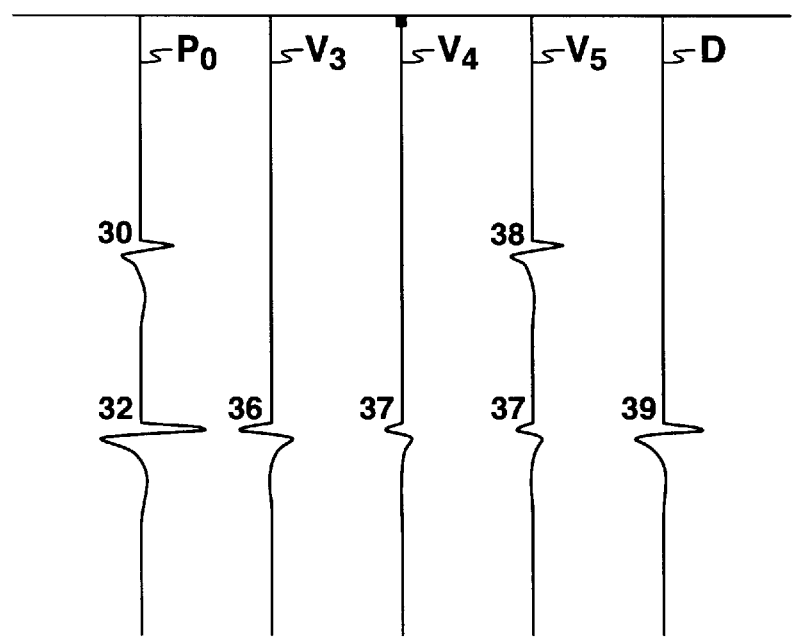
FIG. 5 shows a result of an estimation of the down-going wavefield in an embodiment of the invention.

After a matching filter has been established, it may be applied to the portion of the signal where the polarities are reversed (e.g., pulse 36), such as signal $V_3$ shown in FIG. 5. $V_3$ is the portion of the velocity signal where the polarity of the velocity signal ($V_0$) is not the same as the polarity of the pressure signal ($P_0$). Applying the matching filter of the present embodiment to $V_3$ produces data signal $V_4$ (e.g., pulse 37), where $V_5=V_2+V_4$ is the velocity after matching to the pressure, $P_0$. The down-going wavefield, D (e.g., pulse 39), can then be found because $D=(P_0-V_5)/2$. The same result is obtained by simply subtracting $V_4$ from the pulse 32. After matching, pressure and velocity may be described by the following expressions:

$$P=A+(1+R)D \text{ and} \tag{1}$$

$$V=A-(1-R)D. \tag{2}$$

Equations (1) and (2) describe P and V in terms of the water bottom reflection coefficient R, an up-going wavefield A that comprises the primary reflections and the source side peg-leg multiples, and the down-going wavefield D. The down-going wavefield D comprises the sum of any direct arrival wave, trapped water bottom multiples, and receiver side peg-leg multiples. Equations (1) and (2) are produced by a one dimensional derivation based on fundamental relationships between pressure and velocity. The derivation of equation (1) and (2) is shown below. First, $$\rho \frac{\partial v}{\partial t} = -\frac{\partial P}{\partial z} \text{ and} \tag{3}$$

$$\frac{\partial P}{\partial t} = -\kappa \frac{\partial v}{\partial z} \tag{4}$$

where equation (3) is Newton's Second Law and equation (4) is Hooke's Law. In equations (3) and (4), p is density, κ is bulk modulus, t is time, z is depth (e.g., distance along a vertical axis), P is pressure, and v is particle velocity. Identical wave equations can be derived for P and v by using equations (3) and (4) to generate the expressions:

$$\frac{\partial^2 P}{\partial z^2} = \frac{1}{c^2} \frac{\partial P^2}{\partial t^2} \text{ and} \tag{5}$$

$$\frac{\partial^2 v}{\partial z^2} = \frac{1}{c^2} \frac{\partial v^2}{\partial t^2} \tag{6}$$

where $c^2=\kappa/\rho$. The general solution to equation (5) is given by the expression:

$$P=P_U f(z-ct)+P_D f(z+ct) \tag{7}$$

where f is an arbitrary function and $P_U$ and $P_D$ are arbitrary constants. From Newton's Second Law it can be determined that:

$$\frac{\partial v}{\partial t} = -\frac{P_U}{\rho} f'(z-ct) - \frac{P_D}{\rho} f'(z+ct) \tag{8}$$

where f' is the derivative of arbitrary function f with respect to the argument of f. By integrating equation (8) and evaluating the constant of integration the following expression is obtained:

$$v = \frac{P_U}{\rho c} f(z-ct) - \frac{P_D}{\rho c} f(z+ct). \tag{9}$$

Specifying the positive z-direction as vertically upward, the following expressions may be written for P and V:

$$P=U+D \text{ and} \tag{10}$$

$$V \equiv \rho cv = U-D \tag{11}$$

where U and D are up-going and down-going wavefields, respectively. Equations (10) and (11) show that a combination of P and V may estimate the down-going wavefield. For example, equations (10) and (11) may be combined to show that $$D = \frac{P-V}{2}. \tag{12}$$

This result is consistent with equations (1) and (2), and U=A+RD, where RD is the up-going reflection of D.

A more detailed analysis of up-going and down-going wavefields in a water column may be performed by assuming that an impulse arrives at the seafloor when t=0. The down-going and up-going portions of the trapped water bottom multiples may be expressed as:

$$D_{wt} = \sum_{n=0} R_s^n R^n \delta(t - n\tau_w) \text{ and} \quad (13)$$

$$U_{wt} = R \sum_{n=0} R_s^n R^n \delta(t - n\tau_w) \quad (14)$$

where R is again the water bottom reflection coefficient, $R_s$ is an ocean to air reflection coefficient, $\tau_w$ is a two-way travel time in water, and the direct arrival $\delta(t)$ is included in the summation. The primary wavefield is generated by that portion of the direct arrival (e.g., n=0) that travels into the subsurface and subsequently reflects off of the subsurface formation boundary and is then detected by sensors. Mathematically, the primary wavefield may be expressed as:

$$U_P = (1 - R^2) \sum_{k=1} R_k \delta(t - t_k) \quad (15)$$

where each iteration of summation index k corresponds to a different subsurface interface (e.g., an interface may be a top of a formation, a bottom of a formation, or any acoustic impedance discontinuity), $R_k$ is a reflection coefficient associated with the k-th reflection in the subsea geology, $t_k$ is an associated two-way travel time for the k-th reflection of the wavefield, and $(1-R^2)$ is a two-way transmission coefficient through the water bottom (e.g., the seafloor). A portion of each down-going impulse included in equation (13) gives rise to an impulse that is reflected by the subsurface interfaces.

The up-going wavefields are delayed replicas of the primary and are the source side peg-leg multiples. After traversing the subsurface and being recorded, the primary and source side peg-leg multiples continue to the air-water interface where they are reflected back, thereby establishing periodic reverberations (the receiver side peg-leg multiples). The up-going portion of these wavefields may be expressed as:

$$U_{PL} = (1 - R^2) \sum_{n,m=0,k=1} R_k R_s^{n+m} R^{n+m} \delta[t - t_k - (n+m)\tau_w]. \quad (16)$$

Summation indices n and m represent the order of the source and receiver side peg-legs, respectively. The primary wavefield, as represented in equation (16), is included in equation (16) when n=m=0. When m=0, equation (16) only describes source side peg-leg multiples, while when n=0, equation (16) only describes receiver side peg-leg multiples. As before, k is the summation index representing subsea reflective interfaces.

The reverberations leading to the formation of equation (16) also have down-going wavefields that may be expressed as:

$$D_{PL} = (1 - R^2) \sum_{n=0;m,k=1} R_k R_s^{n+m} R^{n+m-1} \delta[t - t_k - (n+m)\tau_w]. \quad (17)$$

Subsurface reflections are generated by these down-going wavefields in a manner similar to that expressed in equation (13), but these higher order terms (e.g., second order wavefield terms and above) will be ignored in the present embodiments.

By combining up-going (equations (13) and (16)) and down-going (equations (14) and (17)) wavefield expressions as indicated in equations (10) and (11), P and V may be expressed in the following form:

$$P = (1 - R)^2 \left[ \sum_{k=1} R_k \delta(t - t_k) + \sum_{n,k=1} R_k R_s^n R^n \delta(t - t_k - n\tau_w) \right] + \quad (18)$$

$$(1 + R) \left[ \delta(t) + \sum_{n=1} R_s^n R^n \delta(t - n\tau_w) + \right.$$

$$(1 - R^2) \sum_{n=0;m,k=1} R_k R_s^{n+m} R^{n+m-1} \delta[t - t_k - (n+m)\tau_w] \right]$$

and $$V = (1 - R)^2 \left[ \sum_{k=1} R_k \delta(t - t_k) + \sum_{n,k=1} R_k R_s^n R^n \delta(t - t_k - n\tau_w) \right] - \quad (19)$$

$$(1 - R) \left[ \delta(t) + \sum_{n=1} R_s^n R^n \delta(t - n\tau_w) + \right.$$

$$(1 - R^2) \sum_{n=0;m,k=1} R_k R_s^{n+m} R^{n+m-1} \delta[t - t_k - (n+m)\tau_w] \right].$$

A direct arrival wavefield term, $\delta(t)$, has been explicitly shown in equations (18) and (19) while it was embedded as the n=0 term in equation (13). Equations (18) and (19) may be simplified to $$P = A + (1+R)D \text{ and} \quad (20)$$

$$V = A - (1-R)D \quad (21)$$

where equations (20) and (21) are identical to equations (1) and (2), respectively.

Returning to the processing embodiments of the invention, once the matched filter is generated, it is applied to the portion of the signal where the polarities of P and V are reversed so that the matched filter scales that portion of the signal into (1+R)D or −(1−R)D, depending on whether P is being scaled into V or vice versa, respectively.

In the processing embodiment shown, the derivation of equations (1) and (2) is performed for a one dimensional system, and a convolution model that only accounts for first order reflections from subsea geology is used for the up-going wavefields (e.g., for up-going wavefields that are reflections from the subsea geology rather than from the seafloor). The one-dimensional and first order assumptions mean that only one reflection is considered from each layer below the seafloor. In addition, equations (1) and (2) ignore random noise by assuming that A and D are significantly larger than any random noise that is present. Further, the derivation assumes that the velocity is matched with the pressure, but a specific matching process is not specified and any of the aforementioned matching embodiments described herein will function with the invention.

Equations (20) and (21) may be solved for D so that $$D = \frac{P - V}{2} \quad (22)$$

and D is also shown in FIG. 5. In practice, after recorded signals (of pressure and velocity) are matched, D is estimated by applying equation (22) to the recorded data.

As previously described, a hydrophone measures scalar pressure while a vertical geophone measures a particle velocity vector and therefore has an output that depends on the direction of propagation of the measured wavefield. A polarity check between P and V may identify up-going and down-going wavefields in wavefields that are "isolated arrivals" (e.g., where the term "isolated arrivals" refers to up-going and down-going wavefields that are not superimposed). If the up-going and down-going wavefields are superimposed, the situation is more complicated. Typically, if A and D have the same polarity then there is a polarity reversal between P and V when $$\frac{A}{D} < (1-R).$$

This means that $$|D| > \frac{|A|}{|1-R|}.$$

Similarly, if A and D have opposite polarities, then there is a polarity reversal between P and V when $$\frac{A}{D} > -1-R.$$

Therefore, $$|D| > \frac{|A|}{|1+R|}.$$

Hence, as long as $$|D| > \frac{|A|}{|1-R|}$$

there should be a polarity reversal between P and V regardless of the polarity relationship between A and D.

Figure 6:
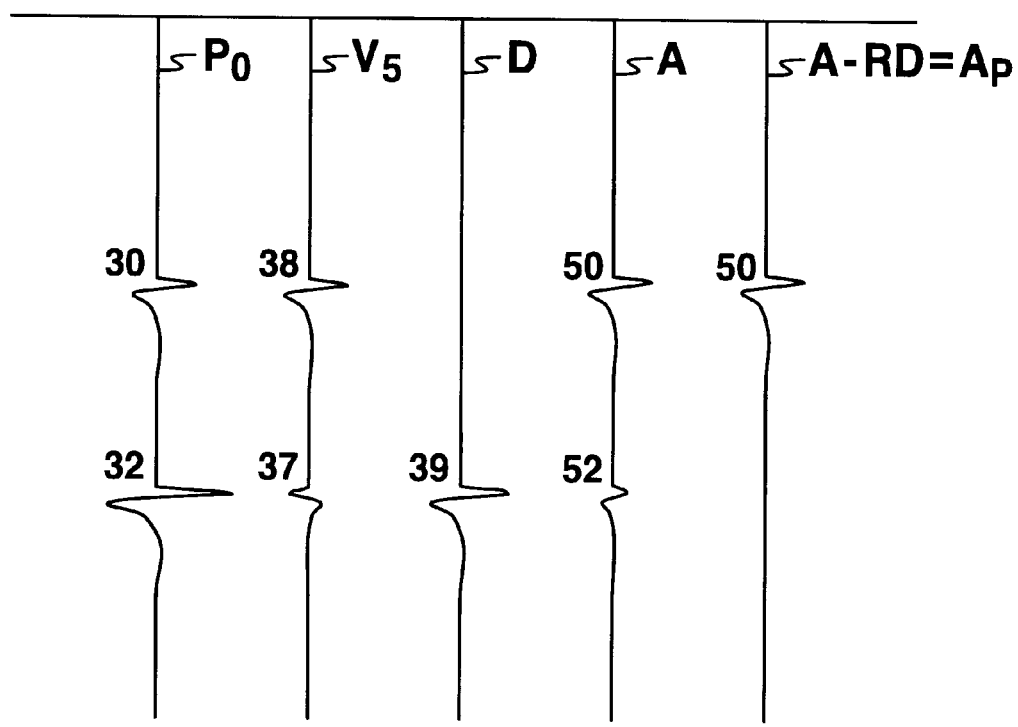
FIG. 6 shows a result where first order receiver side and source side peg-leg multiples have been attenuated

FIG. 6 illustrates a method for eliminating D and a source side peg-leg multiple. $P_0$, $V_S$, and D are repeated from FIG. 5. Up-going wavefield A (i.e., the primary reflections and source side peg-leg multiples) can then be determined by subtracting $(1+R)D$ from $P_0$. This yields pulses 50 and 52, with pulse 50 being substantially identical to pulse 30 of $P_0$. Pulse 52 represents the source side peg leg multiples, which can be removed by subtracting RD from A leaving only $A_p$, the primary up-going wavefield. Mathematically, equations (1) and (2) may be solved for A so that the down-going wavefield may be eliminated from either P or V:

$$P-(1+R^*)D \approx A \text{ and} \tag{23}$$

$$V+(1-R^*)D \approx A. \tag{24}$$

Therefore, D as determined in equation (22) is scaled by either $(1+R^*)$ or $(1-R^*)$ and combined with P or V, respectively, to produce data signal A, where A contains the primary and the source side peg-leg multiples. Note that $R^*$ is an estimate that may be the water bottom reflection coefficient, R.

An important feature of the processing approach of this embodiment is that the pressure and velocity are not combined to form a single output signal. Instead, only one of the signals (either pressure or particle velocity) is processed at a time.

The above suggests an alternate processing embodiment wherein the source side peg-leg multiple is eliminated along with D. This embodiment may be further explained by using equations (18) and (19) to develop a sum of the source and receiver side multiples for the pressure and velocity, respectively. The result shows that:

$$PEG(P) = (1-R^2) \sum_{k,n=1} R_k R_s^n R^n \delta(t-t_k-n\tau_w)\left[\frac{(n+1)R+n}{R}\right] \tag{25}$$

$$PEG(V) = (1-R^2) \sum_{k,n=1} R_k R_s^n R^n \delta(t-t_k-n\tau_w)\left[\frac{(n+1)R-n}{R}\right] \tag{26}$$

where PEG(P) and PEG(V) are summed source and receiver side peg-leg multiples for P and V, respectively, and n is the order (e.g., the number of two-way travel times in the water column) of the multiple. As shown previously, R is the water bottom reflection coefficient, $R_s$ is the ocean to air reflection coefficient, $R_k$ is the reflection coefficient associated with the k-th interface in the subsurface, k is the summation index that covers all subsurface interfaces, t is time, $t_k$ is the two-way travel time associated with the k-th interface, $\tau_w$ is the two-way travel time in the water, $\delta(t)$ is the direct arrival, and $(1-R^2)$ is the two-way transmission coefficient through the water bottom.

Equations (1) and (2) can be rewritten into the following form:

$$P=A_p+(1+R)D_{wt}+PEG(P) \text{ and} \tag{27}$$

$$V=A_p+(R-1)D_{wt}+PEG(V). \tag{28}$$

In equations (27) and (28) $A_p$ is the primary wavefield. The water trapped multiple can be eliminated just as before, but at other times it is possible to eliminate the superimposed source and receiver side peg-leg multiples for equation (27) and (28) by selecting an estimate, $R^*$:

$$R^* = \left(1+\frac{1}{n}\right)R \tag{29}$$

where n is the order of the peg-leg multiple. This estimate would be valid in equations (23) and (24) and would be applied at the time of the n-th peg-leg multiple. For the first order peg-leg multiple, n=1 and $R^*=2R$. For higher order multiples, $R^*<2R$. This estimate can be obtained by solving the following equation when the pressure data are being processed:

$$1+R^* = \frac{P}{D}. \tag{30}$$

However, when the velocity data are being processed the following equation is appropriate:

$$R^*-1 = \frac{V}{D}. \tag{31}$$

Equations (30) and (31) can be used to determine $R^*$ for processing to remove both source side and receiver side peg-leg multiples and the trapped water bottom multiples. In other words, equations (30) and (31) provide an estimate $R^*$ such that:

$$P-(1+R^*)D \approx A_p \text{ and} \tag{32}$$

$$V+(1-R^*)D \approx A_p \tag{33}$$

for the trapped water bottom multiple or superimposed source and receiver side peg-leg multiples. Therefore, D as determined in equation (22) is scaled by either $(1+R^*)$ or (1−R*), depending on whether the pressure or velocity data are being processed.

R* should be estimated differently when attempting to remove only the receiver side peg-leg multiples and the water trapped multiples. This estimate is given within the following equation:

$$-\frac{P}{V} = \frac{1+R^*}{1-R^*}. \quad (34)$$

When R* is determined using equation (34) and multiple attenuation is performed, the results will be consistent with equations (23) and (24). The important point here is that, with an embodiment of the invention, it is possible to process OBC data in a way that not only eliminates the water trapped and receiver side peg-leg multiples, but also indicates how to attenuate the superimposed source and receiver side peg-leg multiples.

When the receiver side peg-leg multiple is eliminated from a pressure signal, a residual up-going wavefield amplitude is typically less than its original amplitude. However, this is not always the result when processing a velocity signal for the removal of only the receiver side peg-leg multiples. The reason for this phenomenon on a velocity signal is that a sum of a source side peg-leg multiple and a receiver side peg-leg multiple can be less than the source side peg-leg multiple by itself. This means that it is possible for the processed velocity signal to have a residual velocity amplitude that is larger than its original velocity amplitude.

Velocity processing may also produce another interesting result because polarity of the residual velocity signal may be the opposite of a polarity of the original velocity signal. These properties provide alternate embodiments for processing the velocity signal. For example, in one embodiment an output velocity signal and an input velocity signal may be summed and divided by a scale factor of two. This step may be followed by a nonlinear comparison between a resulting amplitude of the processed velocity and an input amplitude of the velocity wherein a lower value and its related polarity are selected for further processing. These processing steps may be advantageous when processing OBC sensor data.

Further, there are other embodiments that include alternate methods of estimating the water bottom reflection coefficient, R. One embodiment includes assuming that subsurface layering is essentially horizontal. A "tau-p" transformation may then be applied to data. The tau-p transform is described in Bale, "Plane Wave Deghosting of Hydrophone and Geophone OBC Data," Expanded Abstracts of the 68th Annual Society of Exploration Geophysicists Meeting (1998). After the tau-p transform is applied, one of the previously described embodiments may be used to estimate the water bottom reflection coefficient (R) for each "p" value determined in the tau-p transform.

Another embodiment includes beginning at an early time interval and searching over a specified range of water bottom reflection coefficient (R) values to determine which value of an estimate R* minimizes the energy of the pressure or velocity signal. A next step includes moving to a next time sample and using the previously determined value of R* as an expected value while allowing for some variation of R* about a mean value. This embodiment permits an entire signal to have water bottom reflection coefficients (R*) that are calculated at each time sample using the previously calculated value of R* as an estimated value to guide the search and reduce the number of iterations required in the calculations. If this approach is applied to data collected at a selected sensor pair, then each subsequent signal (corresponding to an adjacent sensor pair) could utilize an adjacent signal's water bottom reflection coefficient as an input for calculations.

Modeled Results

A modeled system was developed to evaluate an embodiment of the invention. Processing methods used in the embodiment are intended to clarify the invention. The embodiment discussed in the modeled example is not intended to limit the scope of the invention.

A so-called "layer cake" earth model (the term "layer cake" refers to modeled geologic layers that are similar to layers in a cake and whose boundaries are assumed to be horizontal planes that are substantially perpendicular to a source direction) was generated to produce modeled pressure and velocity signals. The model signals were processed to evaluate the theory presented in the preceding section. The layer cake model is summarized in Table 1.

TABLE 1

Layer Cake Earth Model

| Layer # | Density (g/cc) | Thickness (ft) | $V_p$ (ft/sec) | $V_s$ (ft/sec) |
|---------|----------------|----------------|----------------|----------------|
| 1 | 0.003 | Semi-infinite | 1100 | 0.000 |
| 2 | 1.000 | 4000 | 4920 | 0.000 |
| 3 | 1.980 | 1778 | 5826 | 2589 |
| 4 | 2.060 | 2000 | 6511 | 3339 |
| 5 | 2.140 | 3333 | 7594 | 4219 |
| 6 | 2.250 | Semi-infinite | 9224 | 5425 |

Figure 7A:
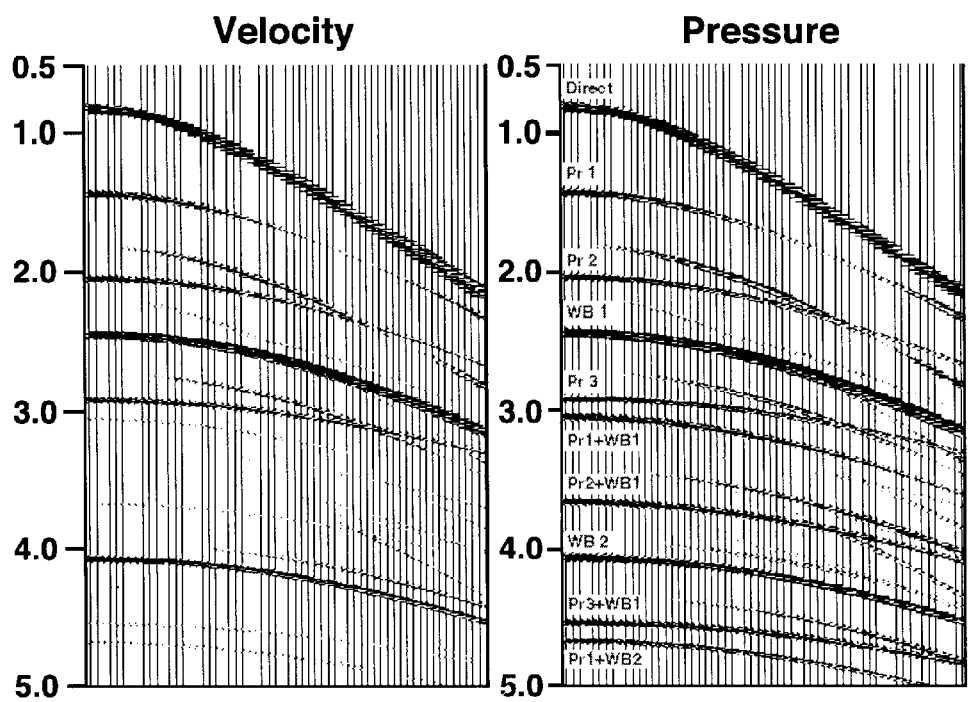
FIG. 7A shows a modeled shot record of pressure and velocity.

The model of Table 1 was used in a wave equation modeling program and the pressure (P) and velocity (V) signals were output. These data were used to test equations (23) and (24) with the assumption of a zero offset water bottom reflection coefficient estimate R*=0.402 (where "zero offset" indicates that the sensor pair recording the data is at the same horizontal position as, but below, the source). FIG. 7A shows pressure and velocity signals for a single shot record (where a "single shot" refers to a single activation of a source). The vertical axis of FIG. 7A represents time (in seconds) and the horizontal axis is the offset (or station) number (e.g., sensor pairs are spaced along an OBC at specific stations, and in the example there were 61 stations spaced 50 meters apart with the near station having zero offset from the source). These axis labels apply to FIGS. 8–20 as well.

In FIG. 7A, "Direct" indicates a direct arrival at the seafloor, and "Pr1," "Pr2," and "Pr3" are primary reflections off tops of layers 4, 5, and 6, respectively. "WB1" and "WB2" are first and second trapped water bottom multiples, and "Pr1+WB1," "Pr2+WB1," and "Pr3+WB1" are first order peg-leg multiples (representing source side plus receiver side multiples) for the first, second, and third primary reflections, respectively. A second order peg-leg multiple, "Pr1+WB2," is also shown. Note that in FIG. 7A the pressure peg-leg multiples are much stronger than the velocity peg-leg multiples.

Figure 7B:
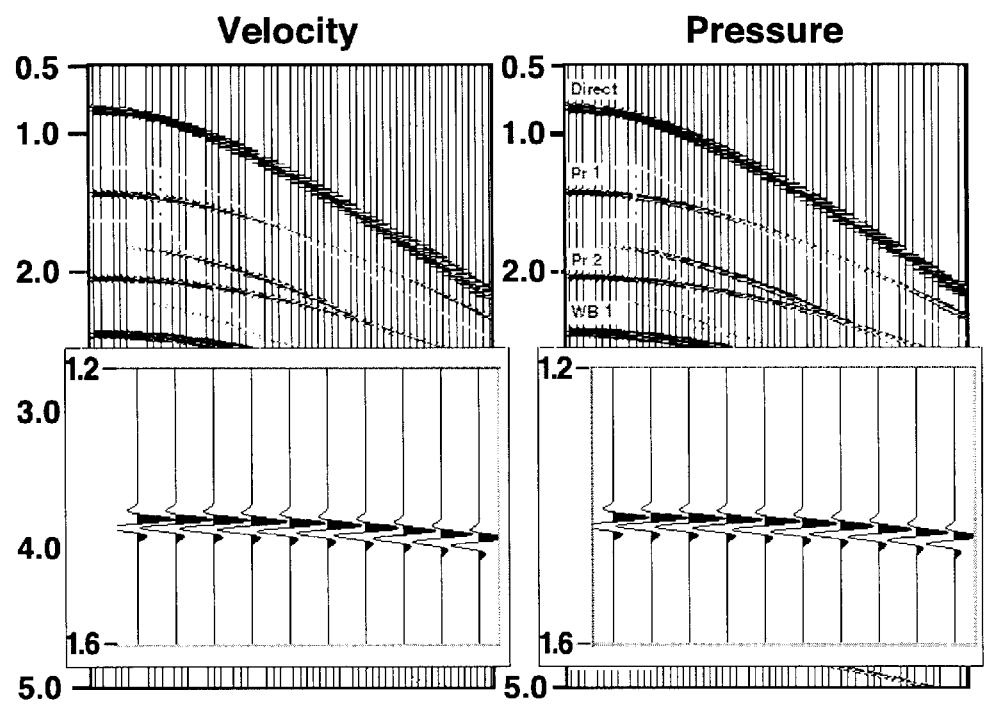
FIG. 7B shows an expanded view of a primary wavefield shown in FIG. 7A.

FIG. 7B shows an expanded portion of the shot record of FIG. 7A. Note that the primary reflections of both the pressure and velocity signals are substantially identical.

Figure 7C:
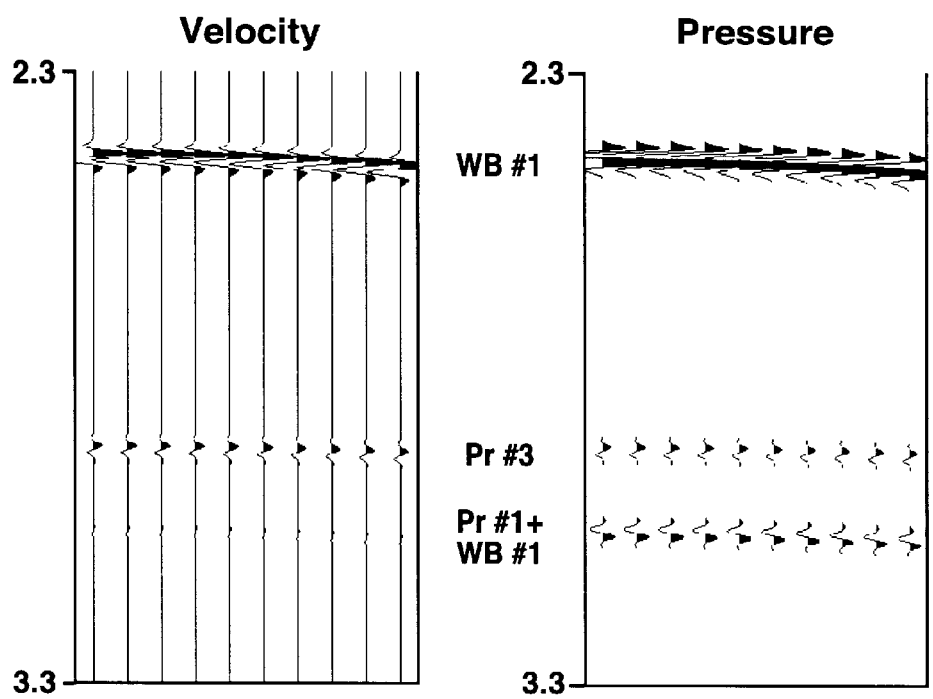
FIG. 7C shows an expanded view of polarity and amplitude comparisons between velocity and pressure signals shown in FIG. 7A.
Figure 8:
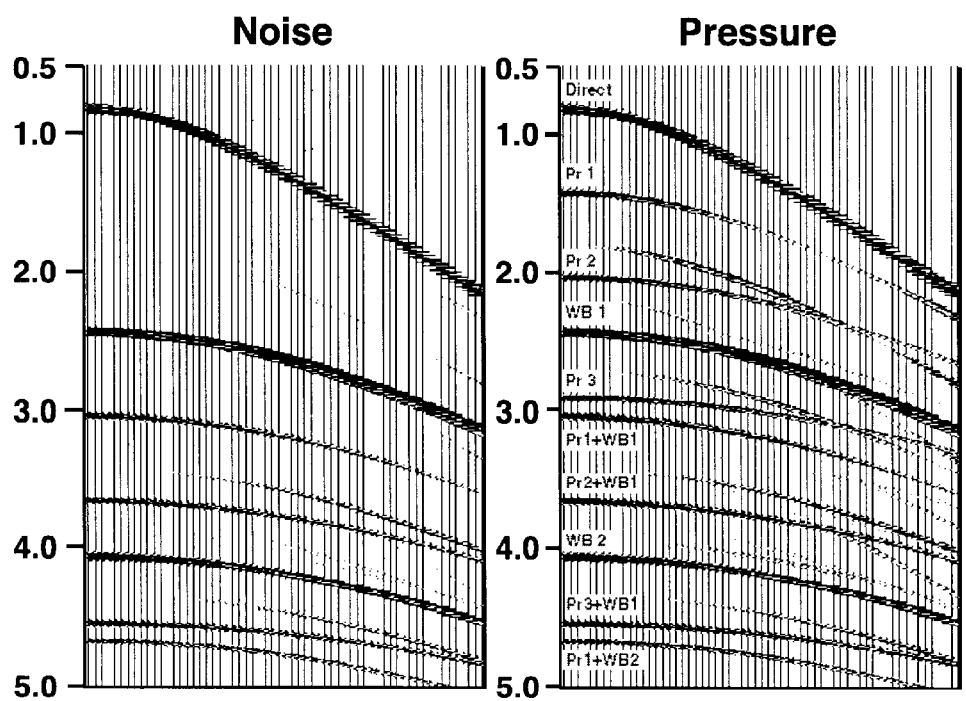
FIG. 8 shows a comparison between the down-going wavefield (or noise) and the pressure signal in the modeled example.
Figure 9:
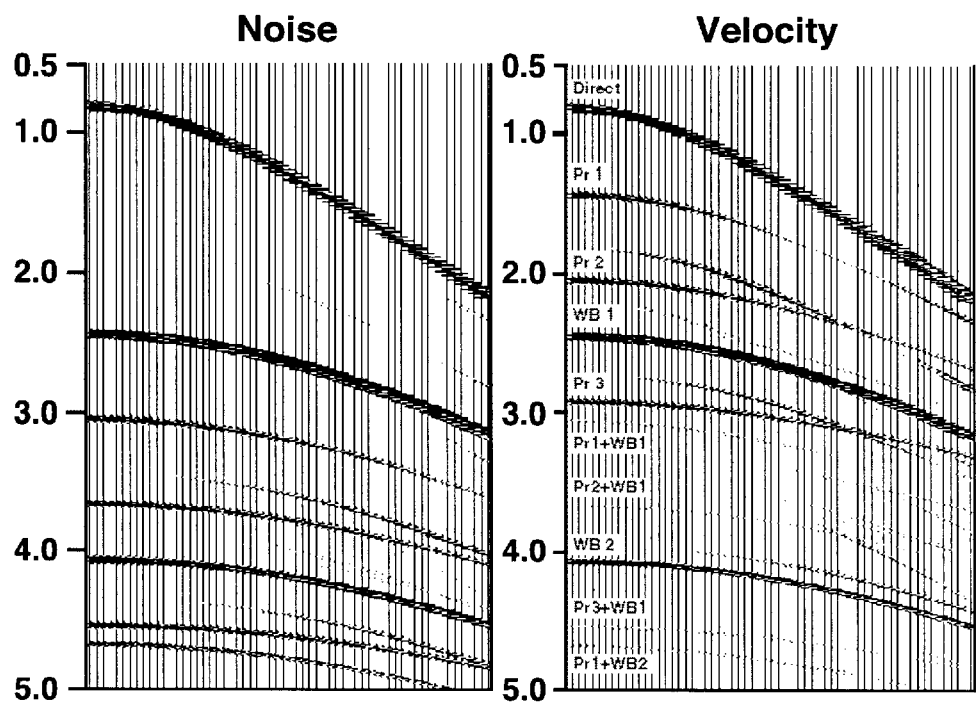
FIG. 9 shows a comparison between the down-going wavefield (or noise) and the velocity signal in the modeled example.
Figure 10:
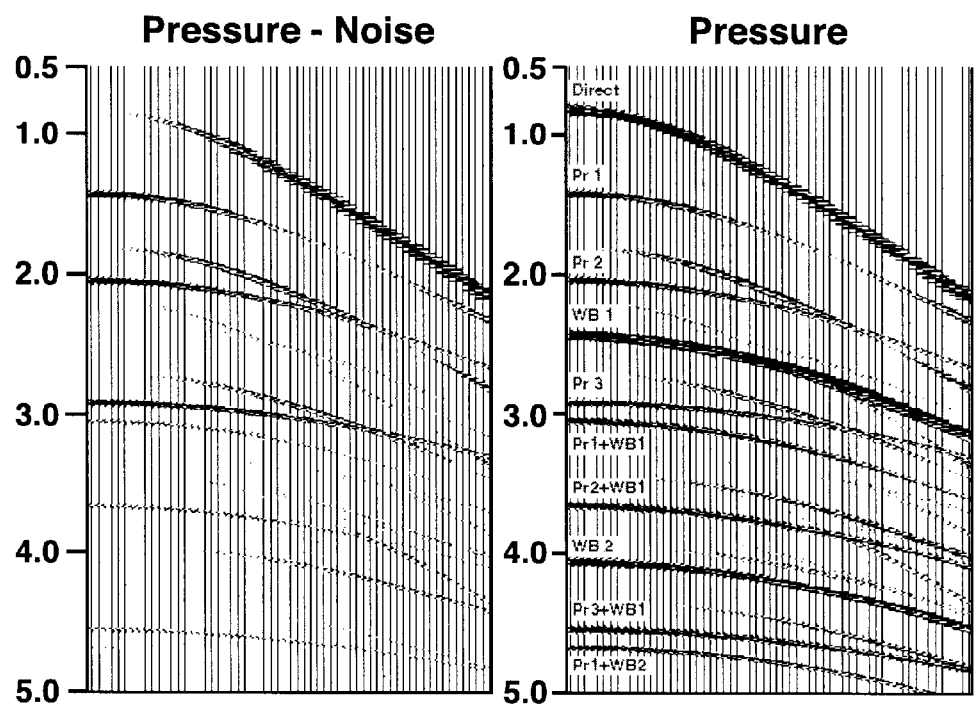
FIG. 10 shows a comparison between the pressure signal and the processed pressure signal (where P=A−(1+R*)D) in an embodiment of the invention.
Figure 11:
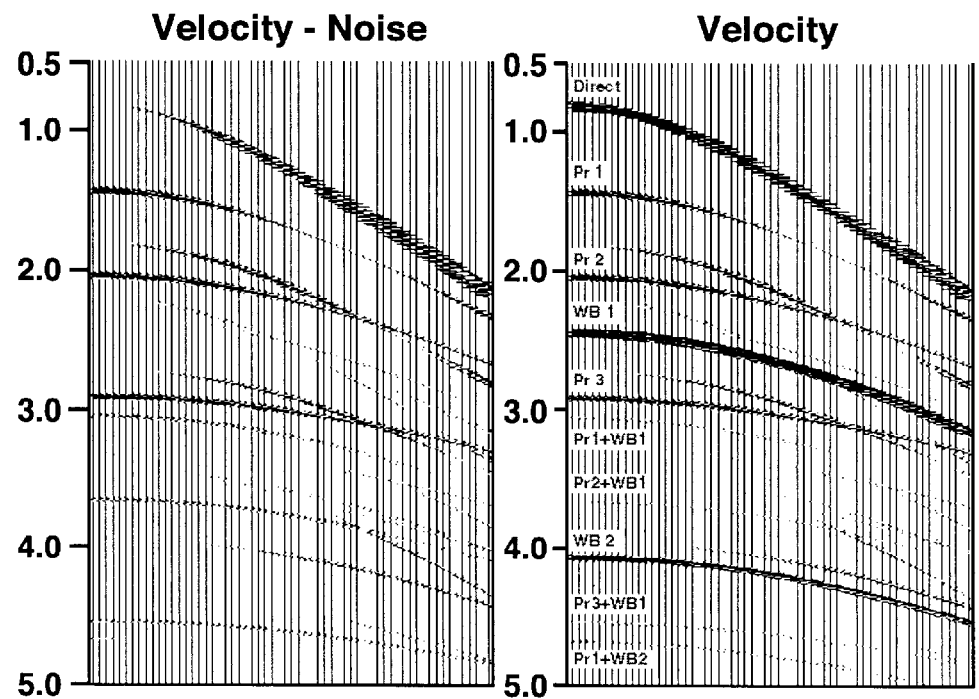
FIG. 11 shows a comparison between the velocity signal and the processed velocity signal (where V=A+(1−R*)D) in an embodiment of the invention.

FIG. 7C is also an expanded view of FIG. 7A, and it also shows that the primary reflections are substantially identical. However, when comparing the pressure and velocity signals it is evident that there are polarity reversals and amplitude differences between water bottom multiple WB1 and peg-leg multiple Pr1+WB1. The reason for the differences in polarity and amplitude is the fact that the down-going wavefield, D, is scaled by (1+R) or −(1−R) for the pressure or velocity, respectively (refer to equations (20) and (21)). Next, equation (12) is used to estimate noise (D), and the results are shown in FIGS. 8 (pressure signal) and 9 (velocity signal). Equations (23) and (24) are then used as a processing algorithm. FIGS. 10 and 11 show the results for pressure and velocity, respectively. An examination of FIGS. 10 and 11 shows that the data signals near zero offset for both pressure and velocity are substantially identical. This is the expected result because after the down-going wavefield (D) is removed, P=V=A.

A further examination of FIGS. 10 and 11 reveals that, when D and R* are substituted in equations (23) and (24), the trapped water bottom multiples WB1 and WB2 are substantially eliminated from the shot record. Further, the direct arrival is substantially removed at near-zero offsets. The direct arrival (and some of the other multiples, as well) is not attenuated as well at stations that are offset further from the source.

FIGS. 10 and 11 also show that amplitudes of the peg-leg multiples are reduced for pressure but enhanced for velocity. This result is produced because the peg-leg multiples shown in FIG. 7A are actually the sum of both the source and receiver side multiples, while FIGS. 10 and 11 only show the residual, or source side multiple. This point may be further examined by using equations (25) and (26) to examine a sum of the source and receiver side multiples for the pressure and velocity, respectively.

When the receiver side multiple is eliminated, PEG(P) is attenuated by $$\left[\frac{R}{(n+1)R+n}\right]$$

and PEG(V) is attenuated by $$\left[\frac{R}{(n+1)R-n}\right].$$

Tables 2 and 3 provide numerical examples of the removal of a first order receiver side peg-leg multiple from PEG(P) and PEG(V), respectively.

TABLE 2

Attenuation of First Order Receiver Side Peg-Leg Multiple from PEG(P)

| Reflection Coefficient (R) | Attenuation (dB) |
| --- | --- |
| 0.20 | −16.90 |
| 0.40 | −13.06 |
| 0.60 | −11.29 |
| 0.80 | −10.24 |

Table 2 shows that PEG(P) is attenuated for all values of R and that the peg-leg's amplitude is reduced more when R is small. For example, when R=0.40 the reduction in amplitude is approximately 25%, and this substantially corresponds to the data signals of Pr1+WB1, Pr2+WB1, and Pr3+WB1 shown in FIG. 10.

TABLE 3

Attenuation of First Order Receiver Side Peg-Leg Multiple from PEG(V)

| Reflection Coefficient (R) | Attenuation (dB) | Polarity Reversal |
| --- | --- | --- |
| 0.20 | −9.54 | Yes |
| 0.33 | 0.00 | Yes |
| 0.40 | +6.02 | Yes |
| 0.50 | No First Order Peg-Leg Multiples | |
| 0.60 | +9.54 | No |
| 0.80 | +2.50 | No |

Table 3 shows that PEG(V)=0 when R=0.50. This result may be discerned from equation (26) for first order peg-leg multiples. When the receiver side peg-leg multiple is removed from PEG(V) and R>0.50, there is no polarity reversal. However, if R<0.50 (as in the modeled example) there is a polarity reversal. Also, when R=0.33 the only effect is a reversal of polarity. When R=0.40 (as in the modeled example), the peg-leg amplitude increases and there is a polarity reversal (see FIG. 11).

Note that Tables 2 and 3 only apply to first order peg-leg multiples. Tables 4 and 5 provide numerical examples for the removal of second order receiver side peg-leg multiples from PEG(P) and PEG(V), respectively.

TABLE 4

Attenuation of Second Order Receiver Side Peg-Leg Multiple from PEG(P)

| Reflection Coefficient (R) | Attenuation (dB) |
| --- | --- |
| 0.30 | −22.28 |
| 0.40 | −18.06 |
| 0.80 | −16.03 |
| 0.90 | −14.81 |

Table 4 shows that second order multiples are attenuated more than first order peg-leg multiples in the pressure output. This result may be examined by comparing FIGS. 5 and 10. The second order peg-leg multiple, Pr1+WB2, appears to conform to the numerical results presented in Table 4.

TABLE 5

Attenuation of Second Order Receiver Side Peg-Leg Multiple from PEG(V)

| Reflection Coefficient (R) | Attenuation (dB) | Polarity Reversal |
| --- | --- | --- |
| 0.20 | −16.90 | Yes |
| 0.30 | −11.29 | Yes |
| 0.40 | −6.02 | Yes |
| 0.50 | 0.00 | Yes |
| 0.67 | No Second Order Peg-Leg Multiples | |
| 0.80 | +6.02 | No |

Table 5 shows similar results to those presented in Table 3. There are polarity reversals when R<0.67. When R=0.40 (as in the modeled example), there is an approximately 50% reduction in amplitude and a polarity reversal.

Figure 12:
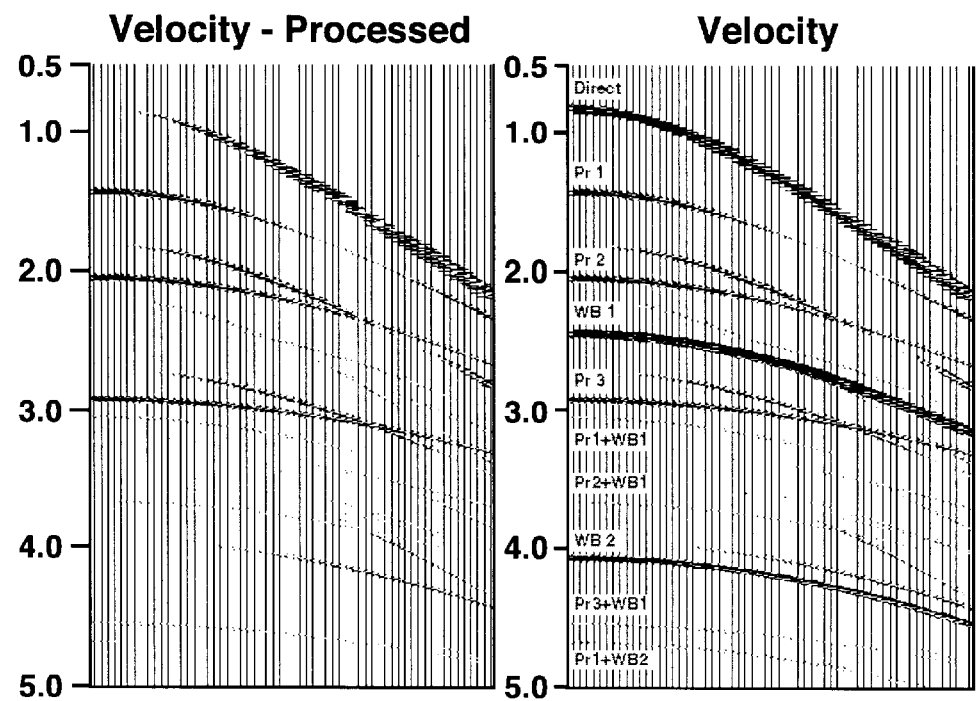
FIG. 12 shows a comparison between the velocity signal and the processed velocity signal after nonlinear processing with an embodiment of the invention.

Because PEG(V) can exhibit an increase in amplitude during processing, a nonlinear analysis may be performed by simply comparing amplitudes of the original and processed velocity signals of FIG. 11 and retaining the lower amplitude value and its corresponding sign. The result of the nonlinear procedure is shown in FIG. 12. The nonlinear processing step retains the attenuation of the water trapped multiple and the second order peg-leg multiple while ensuring that multiple strength is not increased.

The fact that there can be polarity reversals during processing of the velocity suggests that a linear processing step may be useful if applied prior to the application of the nonlinear processing step described above. When R=0.40, summing the two velocity fields (shown on the left and right sides of FIG. 11) would reduce the amplitude of the first and second order peg-leg multiples without affecting the primaries. For example, assuming that the primary is +1, a summation followed by a division by two leaves the primary level unchanged (because the polarity of the primaries is the same on the right and left side of FIG. 11). However, if the peg-leg level is +1, then after processing the level would be −0.50. A summation and division by two would produce a result of −0.25, which is a 12 dB reduction in the peg-leg level and a 6 dB reduction below the original peg-leg level. A second order peg-leg multiple with the same output level of +1 would have an input level of −2. So, a summation and division by 2 would produce a final level of −0.50, a 6 dB decrease in amplitude and a 12 dB reduction below the original level.

The summation process may be followed by another nonlinear step of comparing the summed output with the original (e.g., pre-summation) input, and FIG. 13 shows the result of this process. The left side of FIG. 13 shows the best processed result for velocity. In practice, it may be desirable to perform two nonlinear steps after completing the summation. A first comparison may be made between the original data and the processed data. A second comparison may then be performed between the original data and the summed data.

Ocean Bottom Cable (OBC) Data

In addition to the modeled data contained in the previous section, actual OBC data were analyzed with an embodiment of the invention. The data analyzed in the example were measured in deep water. The embodiment used for processing of the OBC data is intended to be an example to clarify the operation of the invention. The particular embodiment is not intended to limit the scope of the invention.

FIGS. 14A–16A and 14B–16B show hydrophone and geophone data, respectively, for a single shot record. In the shot record, a water bottom multiple is shown at a time interval of approximately 2.55 seconds. Water bottom multiple polarity is reversed between the hydrophone and geophone records, and an extra event of unknown origin occurs at about 3.34 seconds and has the same polarity on the hydrophone and geophone data signals. The events between 2.55 and 3.34 seconds are most likely noise.

FIG. 14C shows a processing result where velocity was matched to pressure. FIG. 15C shows a processing result where pressure was matched to velocity. FIG. 16C shows a velocity signal after zero values were used to replace samples that showed polarity reversal when compared to the pressure signal. FIG. 16C shows the least amount of noise when compared to FIGS. 14C and 15C. However, all of the processed results showed significant improvement when compared to the input signal (e.g., the original unprocessed shot record). Again note that the event at 3.34 seconds is retained in all three FIGS. (14C–16C).

In FIGS. 14 and 15, the noise (D) is estimated using equation (12) and the estimated water bottom reflection coefficient (R*) is estimated using equations (23) and (24). After the initial estimate of R*, each time sample was evaluated with a 10% variation about the mean of the previous value of R*.

Figure 17:
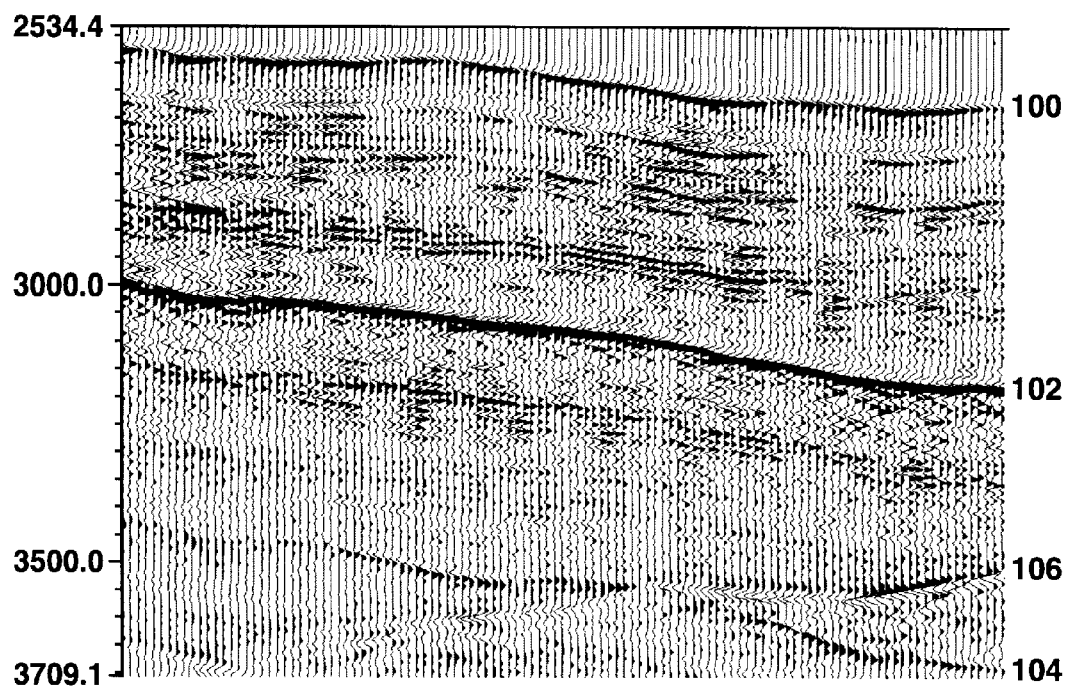
FIG. 17 shows a stacked view of pressure signals in an example of an ocean bottom cable shot record.
Figure 18:
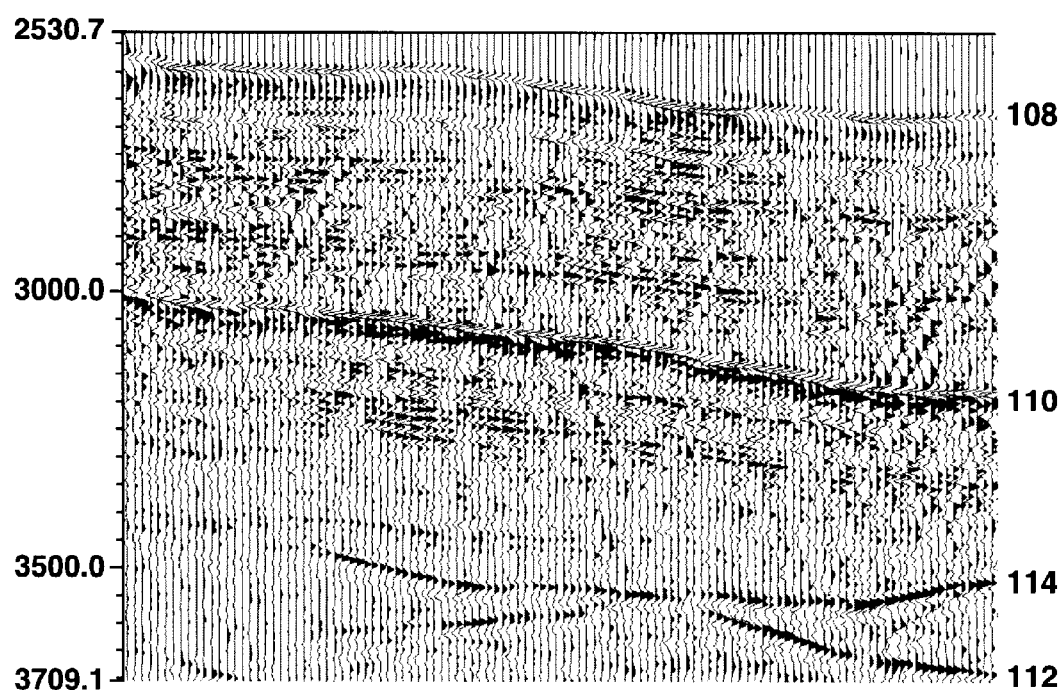
FIG. 18 shows a stacked view of velocity signals in an example of an ocean bottom cable shot record.

FIGS. 17 and 18 show stacked pressure (P) and velocity (V), respectively (where, as discussed previously, the term "stacked" refers to the compilation of successively sampled data signals). FIG. 17 shows a trapped water bottom multiple 100, a peg-leg multiple 102 that was generated by a reflection off of a salt structure, an upcoming "interbed" multiple 104 (typically produced by a reflection off of a boundary between geologic formations), and a peg-leg multiple 106 generated by a reflection off of a bottom of the salt structure.

FIG. 18, which shows a stacked view of velocity data, shows a water bottom multiple 108 and peg-leg multiples 110 and 114 that have opposite polarities of corresponding events in the pressure signal (see FIG. 17). An interbed multiple (112 in FIG. 18) has a same polarity as the interbed multiple (104 in FIG. 17) in the pressure signal.

Figure 19:
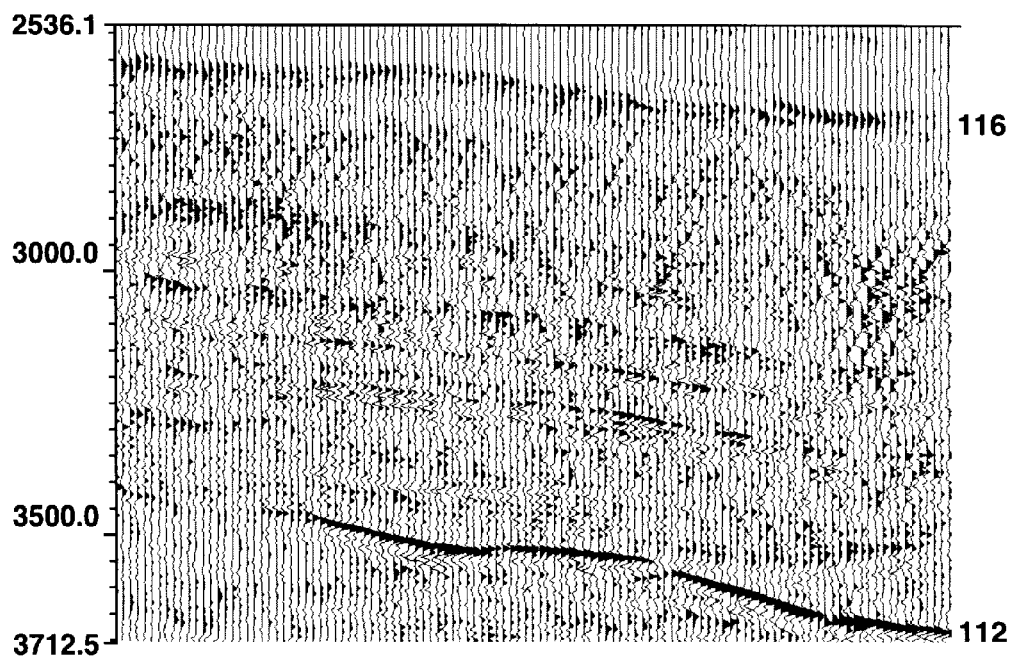
FIG. 19 shows a stacked view of processed velocity signals where polarity reversals were set to zero values with a processing embodiment of the invention.
Figure 20:
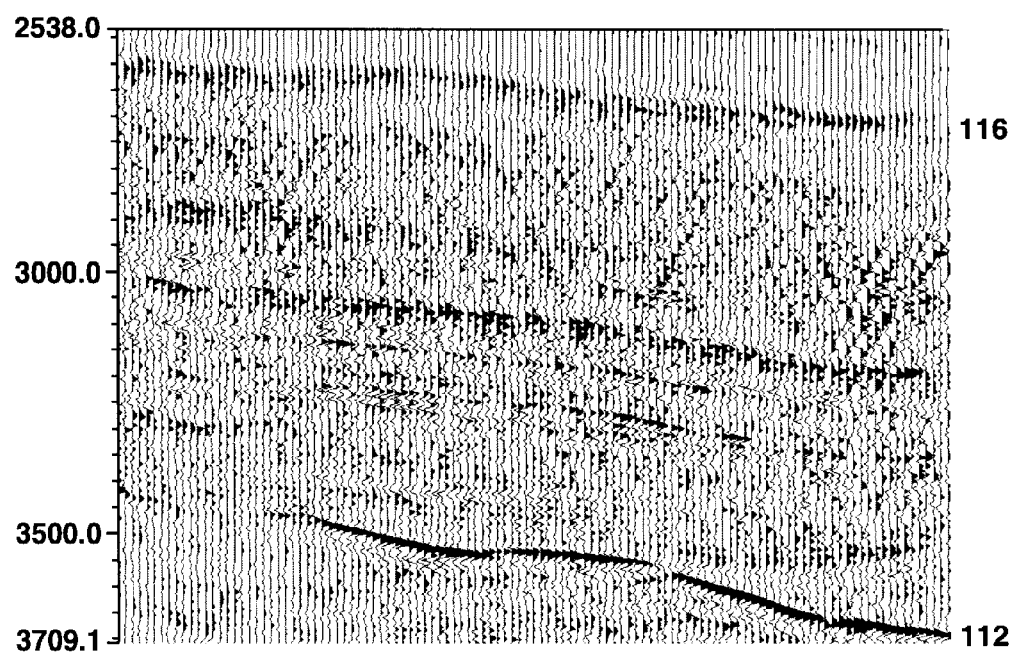
FIG. 20 shows a stack of attenuated velocity signals where processing was performed with an embodiment of the invention.

FIGS. 19 and 20 show stacked portions of velocity signals (wherein a velocity signal was processed with different embodiments of the invention and the results were then stacked, each Figure representing a different processing embodiment). FIG. 19 shows a velocity signal that has been processed with an embodiment of the invention. In FIG. 19, polarities of the velocity signal and a corresponding pressure signal were compared, and zero values were inserted in the velocity signal when the polarities of the two signals did not match. An analysis of FIG. 19 reveals that the trapped water bottom multiple (108 in FIG. 18) and the peg-leg multiples from the top and bottom of the salt structure (110 and 114, respectively, in FIG. 18) have been substantially removed from the velocity signal. The interbed multiple (112 in FIG. 18) is still present in the processed signal and, in fact, appears to have an increased magnitude when compared with FIG. 18. Moreover, additional up-going energy (116 in FIGS. 19 and 20) that is present below the former location of the trapped water bottom multiple event was not removed. This follows from the fact that the processing of this embodiment, as shown in FIG. 19, does not remove source side peg-leg multiples.

FIG. 20 also shows a stack view of processed velocity data. However, FIG. 20 shows a result where equation (24) is used to estimate a water bottom reflection coefficient (R) and to process velocity with equation (22). Visual examination of FIGS. 19 and 20 reveals that the processing embodiment of FIG. 19 produces slightly better attenuation than the processing embodiment of FIG. 20.

The embodiments described and as applied in the modeled and processed results are intended to clarify the application of the invention to both modeled and real world data. Those skilled in the art will appreciate that other embodiments of the invention can be devised which do not depart from the spirit of the invention as disclosed herein. Accordingly, the scope of the invention should be limited only by the attached claims.

What is claimed is:

1. A method for removing trapped water bottom multiples, receiver side peg-leg multiples, and source side peg-leg multiples from dual sensor OBC data comprising a pressure signal and a velocity signal, the method comprising:

determining polarity reversals between the pressure signal and the velocity signal in the sensor data;

separating up-going wavefields from down-going wavefields in the pressure and velocity signals using the polarity reversals;

estimating the down-going wavefield by determining a difference between a portion of the pressure signal where polarity reversals exist and the portion of the velocity signal where polarity reversals exist and applying a scaling factor thereto; and determining an attenuated up-going pressure wavefield by combining the estimated down-going wavefield and the pressure signal.

2. The method of claim 1, further comprising:

matched filtering a portion of the velocity signal where polarity reversals exist.

3. The method of claim 2, wherein the matched filtering comprises multiplying the portion of the velocity signal where polarity reversals exist by a scaling factor.

4. The method of claim 1, wherein applying the scaling factor comprises one of dividing by 2 and multiplying by 0.5.

5. The method of claim 1, wherein the estimating the down-going wavefield further comprises:

estimating a water bottom reflection coefficient; and scaling the estimated down-going wavefield by the estimated water bottom reflection coefficient.

6. The method of claim 5, wherein the estimating further comprises:

calculating the water bottom reflection coefficient by evaluating the equation $$1 + R^* = \frac{P}{D},$$

where $R^*$ is the estimated water bottom reflection coefficient, P is the pressure signal, D is the estimated down-going wavefield, and the evaluating is performed for each of a plurality of time-spaced samples in the portion of the pressure signal where polarity reversals exist.

7. The method of claim 5, wherein the estimating further comprises:

calculating the water bottom reflection coefficient so as to determine a scaling factor for attenuating all multiples except source side peg-leg multiples by evaluating the equation $$-\frac{P}{V} = \frac{1 + R^*}{1 - R^*},$$

where $R^*$ is the estimated water bottom reflection coefficient, P is the pressure signal, V is the velocity signal, and the evaluating is performed for each of a plurality of time-spaced samples in the portion of the pressure signal where polarity reversals exist.

8. The method of claim 2, further comprising:

deconvolving impulse responses of the pressure and velocity signals to provide a filter used in the matched filtering.

9. The method of claim 2, further comprising:

matching the portion of the velocity signal where polarity reversals exist to the portion of the pressure signal where polarity reversals exist and multiplying the result by a filter scaling factor to provide a filter used in the matched filtering.

10. The method of claim 9, wherein the filter scaling factor is determined by the equation $$\frac{1 - R^*}{1 + R^*},$$

where $R^*$ is an estimated water bottom reflection coefficient.

11. The method of claim 2, further comprising:

deconvolving the pressure signal with an impulse response of the pressure signal and convolving the deconvolved pressure signal with an impulse response of the velocity signal to provide a filter used in the matched filtering.

12. The method of claim 2, further comprising:

deconvolving the velocity signal with an impulse response of the velocity signal and convolving the deconvolved velocity signal with an impulse response of the pressure signal to provide a filter used in the matched filtering.

13. The method of claim 1, further comprising:

removing an unmatched time shift in the pressure and velocity signals by resampling the pressure and velocity signals, cross-correlating the resampled pressure and velocity signals to determine the time shift, and then applying the determined time shift to the pressure signal.

14. The method of claim 1, wherein the determining an attenuated up-going pressure wavefield further comprises:

multiplying the estimated down-going wavefield by $(1+R^*)$, where $R^*$ is an estimated water bottom reflection coefficient.

15. The method of claim 5, further comprising:

setting an initial condition that subsea geologic layers are substantially horizontal;

performing a tau-p transformation on the pressure and velocity signals; and determining a water bottom reflection coefficient for at least one p value determined in the tau-p transformation.

16. The method of claim 5, further comprising:

iteratively searching a selected number of time samples in the pressure and velocity signals to determine a water bottom reflection coefficient that minimizes energy in the pressure and velocity signals; and using the determined water bottom reflection coefficient as an expected water bottom reflection coefficient when processing a selected time sample in the pressure signal.

17. The method of claim 16, further comprising:

varying the expected water bottom reflection coefficient about the determined value when processing a subsequent time sample in the pressure signal to reduce the number of iterative searches required to determine a next water bottom reflection coefficient.

18. A method for removing trapped water bottom multiples, receiver side peg-leg multiples, and source side peg-leg multiples from dual sensor OBC data comprising a pressure signal and a velocity signal, the method comprising:

determining polarity reversals between the velocity signal and the pressure signal in the sensor data;

separating up-going wavefields from down-going wavefields in the pressure and velocity signals using the polarity reversals;

estimating the down-going wavefield by determining a difference between a portion of the velocity signal where polarity reversals exist and the portion of the pressure signal where polarity reversals exist and applying a scaling factor thereto; and determining an attenuated up-going velocity wavefield by combining the estimated down-going wavefield and the velocity signal.

19. The method of claim 18, further comprising:

matched filtering a portion of the pressure signal where polarity reversals exist.

20. The method of claim 19, wherein the matched filtering comprises multiplying the portion of the pressure signal where polarity reversals exist by a scaling factor.

21. The method of claim 18, wherein applying the scaling factor comprises one of dividing by 2 and multiplying by 0.5.

22. The method of claim 18, wherein the estimating the down-going wavefield further comprises:

estimating a water bottom reflection coefficient; and scaling the estimated down-going wavefield by the estimated water bottom reflection coefficient.

23. The method of claim 22, wherein the estimating further comprises:

calculating the water bottom reflection coefficient by evaluating the equation $$R^* - 1 = \frac{V}{D},$$

where $R^*$ is the estimated water bottom reflection coefficient, V is the velocity signal, D is the estimated down-going wavefield, and the evaluating is performed for each of a plurality of time-spaced samples in the portion of the velocity signal where polarity reversals exist.

24. The method of claim 22, wherein the estimating further comprises:

calculating the water bottom reflection coefficient so as to determine a scaling factor for attenuating all multiples except source side peg-leg multiples by evaluating the equation $$-\frac{P}{V} = \frac{1 + R^*}{1 - R^*},$$

where $R^*$ is the estimated water bottom reflection coefficient, P is the pressure signal, V is the velocity signal, and the evaluating is performed for each of a plurality of time-spaced samples in the portion of the velocity signal where polarity reversals exist.

25. The method of claim 19, further comprising:

deconvolving impulse responses of the pressure and velocity signals to provide a filter used in the matched filtering.

26. The method of claim 19, further comprising:

matching the portion of the pressure signal where polarity reversals exist to the portion of the velocity signal where polarity reversals exist and multiplying the result by a filter scaling factor to provide a filter used in the matched filtering.

27. The method of claim 26, wherein the filter scaling factor is determined by the equation $$\frac{1 + R^*}{1 - R^*},$$

where $R^*$ is an estimated water bottom reflection coefficient.

28. The method of claim 19, further comprising:

deconvolving the pressure signal with an impulse response of the pressure signal and convolving the deconvolved pressure signal with an impulse response of the velocity signal to provide a filter used in the matched filtering.

29. The method of claim 19, further comprising:

deconvolving the velocity signal with an impulse response of the velocity signal and convolving the deconvolved velocity signal with an impulse response of the pressure signal to provide a filter used in the matched filtering.

30. The method of claim 18, wherein the determining an attenuated up-going velocity wavefield further comprises:

multiplying the estimated down-going wavefield by $(1-R^*)$, where $R^*$ is an estimated water bottom reflection coefficient.

31. The method of claim 18, further comprising:

comparing amplitudes of the matched velocity signal and the up-going wavefield; and determining an attenuated up-going velocity wavefield by using a lower value of the compared amplitudes and a corresponding sign of the lower value.

32. The method of claim 22, further comprising:

iteratively searching a selected number of time samples in the pressure and velocity signals to determine a water bottom reflection coefficient that minimizes energy in the pressure and velocity signals; and using the determined water bottom reflection coefficient as an expected water bottom reflection coefficient when processing a selected time sample in the velocity signal.

33. The method of claim 32, further comprising:

varying the expected water bottom reflection coefficient about the determined value when processing a subsequent time sample in the pressure signal to reduce the number of iterative searches required to determine a next water bottom reflection coefficient.

34. The method of claim 18, further comprising:

removing an unmatched time shift in the pressure and velocity signals by resampling the pressure and velocity signals, cross-correlating the resampled pressure and velocity signals to determine the time shift, and then applying the determined time shift to the velocity signal.

* * * * *